United States Patent
Sonobe

(10) Patent No.: US 10,090,527 B2
(45) Date of Patent: Oct. 2, 2018

(54) BINDER COMPOSITION FOR SECONDARY BATTERY, SLURRY COMPOSITION FOR SECONDARY BATTERY, NEGATIVE ELECTRODE FOR SECONDARY BATTERY, AND SECONDARY BATTERY

(71) Applicant: ZEON CORPORATION, Tokyo (JP)

(72) Inventor: Kenya Sonobe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 123 days.

(21) Appl. No.: 14/773,333

(22) PCT Filed: Mar. 14, 2014

(86) PCT No.: PCT/JP2014/001470
§ 371 (c)(1),
(2) Date: Sep. 5, 2015

(87) PCT Pub. No.: WO2014/141721
PCT Pub. Date: Sep. 18, 2014

(65) Prior Publication Data
US 2016/0028087 A1      Jan. 28, 2016

(30) Foreign Application Priority Data

Mar. 15, 2013   (JP) .................................. 2013-053612

(51) Int. Cl.
| | | |
|---|---|---|
| *H01M 4/62* | (2006.01) | |
| *H01M 10/0525* | (2010.01) | |
| *C08F 236/10* | (2006.01) | |
| *H01M 4/86* | (2006.01) | |

(52) U.S. Cl.
CPC ........... *H01M 4/622* (2013.01); *C08F 236/10* (2013.01); *H01M 10/0525* (2013.01); *H01M 2004/8684* (2013.01)

(58) Field of Classification Search
CPC .... H01M 4/62; H01M 4/622; H01M 2220/30; H01M 2220/10; H01M 2220/20; H01M 10/0525
See application file for complete search history.

(56) References Cited

U.S. PATENT DOCUMENTS

| | | | | |
|---|---|---|---|---|
| 2012/0095131 | A1* | 4/2012 | Kinoshita | H01M 4/621 523/410 |
| 2013/0023076 | A1 | 1/2013 | Uchiyama | |
| 2013/0130102 | A1 | 5/2013 | Sakamoto et al. | |
| 2013/0330622 | A1* | 12/2013 | Sasaki | H01M 4/134 429/217 |
| 2014/0239239 | A1* | 8/2014 | Cha | H01M 4/622 252/519.33 |

FOREIGN PATENT DOCUMENTS

| | | |
|---|---|---|
| JP | H11-288741 A | 10/1999 |
| JP | 2000-106189 A | 4/2000 |
| JP | 2010-176980 A | 8/2010 |
| JP | 2011-134618 A | 7/2011 |
| WO | 2012/002396 A1 | 1/2012 |
| WO | 2012/014818 A1 | 2/2012 |
| WO | 2012/133031 A1 | 10/2012 |
| WO | 2014/002883 A1 | 1/2014 |

OTHER PUBLICATIONS

International Preliminary Report on Patentability and Translation of Written Opinion of the International Searching Authority; PCT/JP2014/001470 dated Sep. 15, 2015.
International Search Report for PCT/JP2014/001470 dated Jun. 3, 2014.

\* cited by examiner

*Primary Examiner* — Muhammad S Siddiquee
(74) *Attorney, Agent, or Firm* — Studebacker & Brackett PC

(57) ABSTRACT

A binder composition for a secondary battery includes: a water-soluble thickener (A) having a hydroxy group or a carboxy group; a cross-linking agent (B) having a functional group reacting with the hydroxy group or the carboxy group of the water-soluble thickener (A); and a particulate polymer (C). The particulate polymer (C) has a functional group reacting with the cross-linking agent (B) and includes an aliphatic conjugated diene monomer unit and an aromatic vinyl monomer unit. The binder composition contains 0.001 part by mass or more and less than 100 parts by mass of the cross-linking agent (B) and 10 parts by mass or more and less than 500 parts by mass of the particulate polymer (C), each per 100 parts by mass of the water-soluble thickener (A).

15 Claims, No Drawings

BINDER COMPOSITION FOR SECONDARY BATTERY, SLURRY COMPOSITION FOR SECONDARY BATTERY, NEGATIVE ELECTRODE FOR SECONDARY BATTERY, AND SECONDARY BATTERY

TECHNICAL FIELD

This disclosure relates to a binder composition for a secondary battery, a slurry composition for a secondary battery, a negative electrode for a secondary battery, and a secondary battery.

BACKGROUND

Secondary batteries such as lithium ion secondary batteries, which have characteristics such as compact size, light weight, high energy-density, and being rechargeable, are used in a wide variety of applications. Thereupon, in recent years, for the purpose of achieving higher performance of secondary batteries, studies have been made to improve battery members such as electrodes.

Here, battery members such as electrodes (active and negative electrodes) of a secondary battery and a porous membrane provided on the electrodes or a separator provided in order to improve the heat resistance and the strength are formed by binding together components contained in those battery members or binding those components and base members (for example, current collectors, electrodes, a separator, and the like) using a binder. Specifically, for example, a negative electrode of a secondary battery commonly includes a current collector and a negative electrode mix layer formed on the current collector. The negative electrode mix layer is formed, for example, by applying a slurry composition onto the current collector and drying the slurry composition thus binding the negative electrode active material and others using a binder. The slurry composition is obtained by dispersing for example a negative electrode active material and a binder composition in a dispersion medium.

Given this factor, in recent years, in order to achieve further improvement in the performance of secondary batteries, there have been attempts to improve binder compositions and slurry compositions used for the formation of those battery members.

Specifically, for example, there has been proposed to improve the performance of a secondary battery by blending a cross-linking agent with a binder composition or a slurry composition used for the formation of electrodes of the secondary battery, and forming electrodes using the binder composition and the slurry composition. For example, JP 2000-106189 A (PTL 1) proposes a secondary battery having a negative electrode comprising a mixture including a negative electrode active material, a binder, a thickener such as carboxymethyl cellulose, and at least one cross-linking agent selected from the group consisting of a melamine-based resin, a urea formalin resin, tannic acid, a glyoxal-based resin, a dimethylol compound, and PVA. Further, PTL 1 describes that for example carboxymethyl celluloses (thickeners) are cross-linked by a cross-linking agent.

For example, JP 2011-134618 A (PTL 2) proposes a binder composition for a secondary battery electrode, including functional-group-containing resin particles that are obtained by emulsion polymerizing ethylenic unsaturated monomers containing keto-group containing ethylenic unsaturated monomers and a multifunctional hydrazide compound as a cross-linking agent. Further, PTL 2 discloses that the functional group-containing resin particles are cross-linked by the multifunctional hydrazide compound.

For example, JP H11-288741 A (PTL 3) proposes a lithium ion secondary battery having a porous coating on at least one of a positive electrode and a negative electrode, in which the positive electrode or the negative electrode is formed using a binder including a water-soluble macromolecular material having a hydroxy group and a cross-linking agent having a functional group reacting with the hydroxy group. Further, PTL 3 describes that the water-soluble macromolecular materials are cross-linked by a cross-linking agent.

CITATION LIST

Patent Literature

PTL 1: JP 2000-106189 A
PTL 2: JP 2011-134618 A
PTL 3: JP H11-288741 A

The above-described binder compositions used for the formation of battery members are required to have good binding capacity and to achieve good electrical characteristics (for example, initial coulombic efficiency, cycle characteristics, rate characteristics) of secondary batteries when the battery members formed using the binder compositions are applied to the secondary batteries.

However, the above conventional binder compositions could not achieve either good binding capacity or good electrical characteristics of the secondary batteries using the binder compositions at a sufficiently high level. Therefore, the above conventional binder compositions needed to be improved in terms of enhancing both the binding capacity and the electrical characteristics of secondary batteries using the binder compositions.

SUMMARY

It could therefore be helpful to provide a binder composition for a secondary battery, the binder composition having excellent binding capacity and being capable of improving the electrical characteristics of a secondary battery when used to form a battery member of the secondary battery. It could also be helpful to provide a slurry composition for a secondary battery, which makes it possible to achieve excellent adherence between a current collector and an electrode active material layer and can be used for the formation of an electrode capable of improving the electrical characteristics of the secondary battery.

It could also be helpful to provide a negative electrode for a secondary battery, which can achieve excellent adherence between a current collector and a negative electrode mix layer and can improve the electrical characteristics of the secondary battery.

It could also be helpful to provide a secondary battery which can achieve excellent adherence between a current collector and a negative electrode mix layer and has excellent electrical characteristics.

We made various studies to achieve the above objectives. We found that such a binder composition described below has excellent binding capacity and can improve the electrical characteristics of a secondary battery when used for the formation of the battery members. The binder composition is obtained by mixing a water-soluble thickener (A) having a hydroxy group or a carboxy group; a cross-linking agent (B) having a functional group reacting with the hydroxy group or the carboxy group of the water-soluble thickener (A); and a particulate polymer (C) having a certain main chain structure and a functional group that reacts with the cross-linking agent (B). For the binder composition, the mixing ratios of the mixed cross-linking agent (B) and the certain particulate polymer (C) to the water-soluble thickener (A) are within the respective ranges.

Specifically, with a view to advantageously solving the above-described problems, a binder composition for a secondary battery comprises: a water-soluble thickener (A) having a hydroxy group or a carboxy group; a cross-linking agent (B) having a functional group reacting with the hydroxy group or the carboxy group of the water-soluble thickener (A); and a particulate polymer (C), wherein the particulate polymer (C) has a functional group reacting with the cross-linking agent (B) and includes an aliphatic conjugated diene monomer unit and an aromatic vinyl monomer unit, and the binder composition contains 0.001 part by mass or more and less than 100 parts by mass of the cross-linking agent (B) and 10 parts by mass or more and less than 500 parts by mass of the particulate polymer (C), each per 100 parts by mass of the water-soluble thickener (A). The binder composition includes the water-soluble thickener (A) having a hydroxy group or a carboxy group, the cross-linking agent having a functional group reacting with the hydroxy group or the carboxy group (B), and the particulate polymer (C) having a certain main chain structure and a functional group that reacts with the cross-linking agent such that the mixing ratios of the cross-linking agent (B) and the particulate polymer (C) to the water-soluble thickener (A) are within certain ranges; thus, the binder composition can be obtained which has excellent binding capacity and can improve the electrical characteristics of the secondary battery when used for the formation of the battery members.

Here, for the binder composition for a secondary battery, the water solubility of the cross-linking agent (B) is preferably 80% by mass or more. The water solubility of the cross-linking agent (B) being 80% by mass or more prevents the cross-linking agent (B) from being unevenly distributed in the slurry composition for a secondary battery containing the binder composition, and improves the electrical characteristics of a secondary battery formed using the slurry composition for a secondary battery.

Here, for the binder composition for a secondary battery, the cross-linking agent (B) is preferably a multifunctional epoxy compound. The cross-linking agent (B) being a multifunctional epoxy compound can ensure stability of the slurry composition for a secondary battery containing the binder composition and improves the electrical characteristics of a secondary battery formed using the slurry composition for a secondary battery.

For the binder composition for a secondary battery, the water-soluble thickener (A) is preferably at least one selected from the group consisting of: carboxymethyl cellulose, methyl cellulose, hydroxypropyl methylcellulose, hydroxyethyl methylcellulose, polyvinyl alcohol, and polyacrylic acid, and salts thereof. The water-soluble thickener (A) being at least one selected from the above group allows the slurry composition for a secondary battery containing the binder composition to be applied onto a substrate of a current collector or the like with good workability.

Preferably, for the binder composition for a secondary battery, the functional group reacting with the cross-linking agent (B) in the particulate polymer (C) is at least one selected from the group consisting of a carboxy group, a hydroxy group, a glycidyl ether group, and a thiol group. The functional group reacting with the cross-linking agent (B) in the particulate polymer (C) being at least one selected from the above group can achieve good electrical characteristics such as good cycle characteristics of the secondary battery obtained using the binder composition.

Further, with a view to advantageously solving the above-described problems, a slurry composition for a secondary battery of this disclosure comprises: a water-soluble thickener (A) having a hydroxy group or a carboxy group; a cross-linking agent (B) having a functional group reacting with the hydroxy group or the carboxy group of the water-soluble thickener (A); a particulate polymer (C); an electrode active material; and water, wherein the particulate polymer (C) has a functional group reacting with the cross-linking agent (B) and includes an aliphatic conjugated diene monomer unit and an aromatic vinyl monomer unit, and the slurry composition contains 0.001 part by mass or more and less than 100 parts by mass of the cross-linking agent (B) and 10 parts by mass or more and less than 500 parts by mass of the particulate polymer (C), each per 100 parts by mass of the water-soluble thickener (A). The slurry composition includes the water-soluble thickener (A) having a hydroxy group or a carboxy group, the cross-linking agent (B) having a functional group reacting with the hydroxy group or the carboxy group, and the particulate polymer (C) having a certain main chain structure and a functional group that reacts with the cross-linking agent such that the mixing ratios of the mixed cross-linking agent (B) and the particulate polymer (C) to the water-soluble thickener (A) are within certain ranges; thus, the slurry composition for a secondary battery can be obtained which makes it possible to achieve excellent adherence between a current collector and an electrode active material layer and can be used to form an electrode that can improve the electrical characteristics of a secondary battery.

Further, with a view to advantageously solving the above-described problems, a negative electrode for a secondary battery of this disclosure comprises a negative electrode mix layer obtained from the above slurry composition for a secondary battery, in which the electrode active material is a negative electrode active material. As described above, the above slurry composition for a secondary battery is used to form a negative electrode mix layer, thereby obtaining a negative electrode which makes it possible to achieve excellent adherence between a current collector and the negative electrode mix layer and can improve the electrical characteristics of a secondary battery.

Here, the electrode mix layer preferably has a crosslinking structure formed from the water-soluble thickener (A), the cross-linking agent (B), and the particulate polymer (C). Specifically, the cross-linking agent (B) forms a preferable crosslinking structure for making links between water-soluble thickeners (A), between a water-soluble thickener (A) and a particulate polymer (C), and between particulate polymers (C), thereby sufficiently improving the adherence between a current collector and the negative electrode mix layer and sufficiently improving the electrical characteristics of the secondary battery.

Further, with a view to advantageously solving the above-described problems, a secondary battery of this disclosure comprises one of the above negative electrodes for secondary batteries, a positive electrode, an electrolyte solution, and a separator. The secondary batteries using the above-described negative electrodes for secondary batteries have excellent electrical characteristics and have excellent adherence between a current collector and a negative electrode mix layer.

ADVANTAGEOUS EFFECT OF INVENTION

The binder composition for a secondary battery of this disclosure makes it possible to achieve good binding capacity and can improve the electrical characteristics of a secondary battery using a battery member formed using the binder composition. Further, the slurry composition for a secondary battery of this disclosure can form an electrode which has excellent adherence between a current collector and an electrode active material layer, and can improve the electrical characteristics of the secondary battery.

Furthermore, the negative electrode for a secondary battery of this disclosure can improve the adherence between a current collector and a negative electrode mix layer and can improve the electrical characteristics of a secondary battery.

Moreover, the secondary battery of this disclosure can have improved electrical characteristics and can ensure satisfactory adherence between the negative electrode mix layer and the current collector.

DETAILED DESCRIPTION

Embodiments of this disclosure will now be described in detail.

It is to be noted that the binder composition for a secondary battery of this disclosure can be used for battery members of a secondary battery, for example, a positive electrode, a negative electrode, a separator, porous membranes provided on those members, yet is preferably used for a negative electrode. The slurry composition for a secondary battery of this disclosure contains the binder composition for a secondary battery of this disclosure and is used to form a battery member of a secondary battery, preferably, a negative electrode of the secondary battery. The negative electrode for a secondary battery of this disclosure can be produced using the slurry composition for a secondary battery of this disclosure. Further, the secondary battery of this disclosure uses the negative electrode for a secondary battery of this disclosure.

(Binder Composition for Secondary Battery)

The binder composition for a secondary battery of this disclosure includes a water-soluble thickener (A) having a hydroxy group or a carboxy group; a cross-linking agent (B) having a functional group reacting with the hydroxy group or the carboxy group of the water-soluble thickener (A); and a particulate polymer (C). The binder composition for a secondary battery contains 0.001 part by mass or more and less than 100 parts by mass of the cross-linking agent (B) and 10 parts by mass or more and less than 500 parts by mass of the particulate polymer (C), each per 100 parts by mass of the water-soluble thickener (A). The components will now be described particularly with examples of using the binder composition to form a negative electrode.

<Water-soluble Thickener (A)>

A water-soluble thickener (A) having a hydroxy group or a carboxy group (hereinafter may be abbreviated as "water-soluble thickener (A)") serves as a viscosity modifier of the binder composition and the slurry composition containing the binder composition. As the water-soluble thickener (A) having a hydroxy group or a carboxy group, any compound can be used as long as it has a hydroxy group or a carboxy group in its molecular structure and can be used as a water-soluble thickener. The water-soluble thickener (A) is preferably a water-soluble thickener having at least a hydroxy group.

Here, in this specification, a thickener being "water-soluble" means the following. When a mixture obtained by adding 1 part by mass (solid content equivalent) of the thickener to 100 parts by mass of ion-exchanged water is stirred and conditioned to meet one of the conditions satisfying the range of temperature of 20° C. to 70° C. and the range of pH of 3 to 12 (NaOH aqueous solution and/or HCl aqueous solution are used for pH adjustment) and is passed through a screen of mesh size 250; the mass of the solid content of the residue left on the screen does not exceed 50% by mass with respect to the solid content of the added thickener. Even if the mixture of the above thickener and water is in the form of an emulsion which separates into two phases when left to stand, the thickener is regarded to be water-soluble as long as the above definition is satisfied.

Examples of the water-soluble thickener (A) include carboxymethyl cellulose, methyl cellulose, hydroxypropyl methylcellulose, hydroxyethyl methylcellulose, polyvinyl alcohol, and polyacrylic acid, and salts thereof in terms of achieving good workability when the slurry composition containing the binder composition is applied onto a current collector, for example. Of those, carboxymethyl cellulose is preferred. The water-soluble thickener (A) may be used alone or in a combination of two or more thereof.

When carboxymethyl cellulose is used as the water-soluble thickener (A), the degree of etherification of the carboxymethyl cellulose used is preferably 0.4 or more, more preferably, 0.7 or more and preferably 1.5 or less, more preferably 1.0 or less. The use of carboxymethyl cellulose having a degree of etherification of 0.4 or more leads to better workability in applying onto a current collector or the like, the slurry composition for a secondary battery containing the binder composition for a secondary battery. When the degree of etherification is less than 0.4, the intramolecular and intermolecular hydrogen bond of carboxymethyl cellulose is strong, so that the water-soluble thickener would become a gel. In addition, the thickening effect would be hardly obtained in preparing the slurry composition for an electrode of a secondary battery, which would deteriorate the workability in preparing the slurry composition for an electrode of a secondary battery. Further, in the application of the obtained slurry composition for an electrode of a secondary battery onto a current collector to form a cross-linking structure, carboxymethyl cellulose and a cross-linking agent hardly react, which would deteriorate the characteristics of the electrode to be obtained. Further, the use of carboxymethyl cellulose having a degree of etherification of 1.5 or less results in a sufficient number of hydroxy groups per one molecule of carboxymethyl cellulose, thereby achieving good reactivity to the cross-linking agent (B) described below. Accordingly, the carboxymethyl cellulose can form a good crosslinking structure with the cross-linking agent (B). The formation of the crosslinking structure makes it possible to achieve good binding capacity of the binder composition of this disclosure and achieve excellent cycle characteristics of the secondary battery, as be described in detail below.

Note that the degree of etherification of carboxymethyl cellulose refers to the average number of hydroxy groups substituted with substituents such as a carboxyl methyl group per unit of anhydroglucose included in carboxymethyl cellulose. The degree of etherification may be a value more than 0 and less than 3. Accordingly, when the degree of etherification is higher, the ratio of the hydroxy groups per molecule of carboxymethyl cellulose decreases (in other words, the ratio of the substituents increases); and when the degree of etherification is lower, the ratio of the hydroxy groups per molecule of carboxymethyl cellulose increases (in other words, the ratio of the substituents decreases). The degree of etherification (substitution degree) can be determined by a method described in JP 2011-034962 A.

The viscosity of a 1% by mass aqueous solution of the water-soluble thickener (A) is preferably 500 mPa·s or more, more preferably, 1000 mPa·s or more and preferably 10000 mPa·s or less, more preferably, 9000 mPa·s or less. The use of a water-soluble thickener having a viscosity of 500 mPa·s or more in a 1% by mass aqueous solution can impart suitable viscosity to the slurry composition containing the binder composition. This results in good workability in applying the slurry composition onto a current collector. Further, the use of a water-soluble thickener having a viscosity of 10000 mPa·s or less in a 1% by mass aqueous solution prevents the viscosity of the slurry composition containing the binder composition from being excessively high, makes it possible to achieve good workability in applying the slurry composition onto a current collector, and can improve the adherence between the current collector and the negative electrode mix layer obtained using the slurry composition containing the binder composition. Note that the viscosity of the water-soluble thickener of the 1% by mass aqueous solution is a value measured using a Brookfield viscometer at 25° C. at a rotation speed of 60 rpm.

<Cross-linking Agent (B)>

A cross-linking agent (B) having a functional group reacting with the hydroxy group or the carboxy group in the water-soluble thickener (A) (hereinafter also abbreviated as "cross-linking agent (B)") forms a crosslinking structure with the above water-soluble thickener (A) having a hydroxy group or a carboxy group and a particulate polymer (C) described below, by heating or the like. Specifically, the cross-linking agent (B) is inferred to form a preferable crosslinking structure for making links between water-soluble thickeners (A), between the water-soluble thickener (A) and a particulate polymer (C), and between the particulate polymers (C).

Accordingly, the binder composition of this disclosure and the slurry composition containing the binder composition of this disclosure are subjected to heat or the like, so that the water-soluble thickener (A) and the particulate polymer (C) contained in the composition form a crosslinking structure with the cross-linking agent (B). As a result, the crosslinks between the water-soluble thickeners (A), between the water-soluble thickener (A) and the particulate polymer (C), and between the particulate polymers (C) can give such a crosslinking structure as excellent in the mechanical properties such as the elastic modulus, the tensile strength, and the fatigue resistance and adhesiveness; and low in solubility in water. Therefore, when the binder composition and the slurry composition containing the binder composition are used to prepare battery members for a secondary battery, components of electrode members (for example, an electrode active material and the like) can be well bound, and the electrical characteristics of a secondary battery using the battery members can be improved. Specifically, when the binder composition and the slurry composition containing the binder composition are used to prepare a negative electrode for a secondary battery, the formation of the crosslinking structure can suppress the expansion of the negative electrode caused by the repetition of charge and discharge and can ensure high adherence between a negative electrode mix layer and a current collector. Further, the use of the water resistance obtained by the formation of the crosslinking structure (low solubility in water) allows a porous membrane or the like to be formed on the negative electrode mix layer using an aqueous slurry composition. Further, due to the cross-linking agent (B) and the structure derived from the cross-linking agent (B), the injection property of an electrolyte solution can be improved in forming a secondary battery using battery members prepared with the use of the binder composition or the slurry composition containing the binder composition. As a result, the electrical characteristics such as the initial coulombic efficiency, the cycle characteristics, and the rate characteristics can be improved.

It should be noted that when the binder composition and the slurry composition containing the binder composition do not contain the water-soluble thickener (A) having a hydroxy group or a carboxy group, that is, when a cross-linking structure is formed only between the particulate polymers (C), the obtained crosslinking structure cannot be sufficiently excellent in the mechanical properties such as the elastic modulus, tensile strength, and fatigue resistance, for example, the expansion of the negative electrode cannot be suppressed. Further, when the binder composition and the slurry composition containing the binder composition do not contain the particulate polymer (C) described below, that is, when a crosslinking structure is formed only between the water-soluble thickeners (A), the obtained crosslinking structure becomes excessively rigid, for example, the flexibility of an electrode using the binder composition for a secondary battery is reduced, which would lead to the deteriorated cycle characteristics.

Here, the binder composition for a secondary battery necessarily contains 0.001 part by mass or more and less than 100 parts by mass of the cross-linking agent (B) per 100 parts by mass of the water-soluble thickener (A). The content is preferably 0.1 part by mass or more, more preferably 0.5 part by mass or more, yet more preferably 1 part by mass or more, particularly preferably 3 parts by mass or more, and most preferably 5 parts by mass or more; and preferably 90 parts by mass or less, more preferably 60 parts by mass or less, yet more preferably 50 parts by mass or less, particularly preferably 40 parts by mass or less, and most preferably 30 parts by mass or less. The binder composition for a secondary battery contains 0.001 part by mass or more of the cross-linking agent (B) per 100 parts by mass of the water-soluble thickener (A), thus forming a good crosslinking structure. Accordingly, when the binder composition and the slurry composition containing the binder composition are used, for example, for the formation of a negative electrode, satisfactory adherence between a negative electrode mix layer and a current collector can be ensured and satisfactory cycle characteristics of the secondary battery can be ensured. Further, since those cross-linking agents (B) have excellent affinity to electrolyte solutions, when the binder composition for a secondary battery contains 0.001 part by mass or more of the cross-linking agent (B) per 100 parts by mass of the water-soluble thickener (A), in the production of a secondary battery including the negative electrode obtained using the binder composition, good injection property of the electrolyte solution can be achieved and the electrical characteristics such as the rate characteristics and the cycle characteristics can be improved. The binder composition for a secondary battery containing less than 100 parts by mass of the cross-linking agent (B) per 100 parts by mass of the water-soluble thickener (A) suppresses nonuniformity in the crosslinking structure, specifically, suppresses the formation of a local rigid portion which would be an origin of a fracture, thereby ensuring close adherence between a negative electrode mix layer and a current collector. Further, inhibition of migration of charge carriers in the negative electrode mix layer due to excessively occurring crosslinking can be restrained, so that satisfactory electrical characteristics such as the initial coulombic efficiency, rate characteristics, and cycle characteristics that are satisfactory can be ensured. Electrochemical side reactions caused by impurities (chlorine-containing compounds or the like) derived from cross-linking agent can be restrained, thereby ensuring the satisfactory cycle characteristics. In addition, when the amount of the cross-linking agent (B) is excessive, a large amount of the cross-linking agent (B) is deposited on an electrode surface to form a cross-linked film with the water-soluble thickener (A), which results in the deteriorated injection property of the electrolyte solution. However, the binder composition for a secondary battery containing less than 100 parts by mass of the cross-linking agent (B) per 100 parts by mass of the water-soluble thickener (A) can sufficiently suppress such deterioration of the injection property.

The cross-linking agent (B) is not limited in particular as long as it is a cross-linking agent having a functional group reacting with the hydroxy group or carboxy group of the water-soluble thickener (A); however, the number of the reactive functional groups in one molecule of the cross-linking agent is preferably 2 or more and preferably less than 6, more preferably less than 4. With the number of the reactive functional groups in one molecule of the cross-linking agent (B) (the average of all the cross-linking agents) being within the above range, in the slurry composition containing the binder composition for a secondary battery, sedimentation due to the coagulation of the components can be prevented, thereby ensuring satisfactory stability of the slurry composition. Here, the reactive functional groups in the cross-linking agent (B) are groups that are reactive with at least one of the hydroxy group and carboxy group in the water-soluble thickener (A) and the functional group reacting with the cross-linking agent (B) in the particulate polymer (C), for example, an epoxy group (including a glycidyl group and a glycidyl ether group), a hydroxy group, an oxazoline group, and a carbodiimide group. Of those, it is preferable that the cross-linking agent (B) has a glycidyl ether group in particular.

Specifically, in order to ensure satisfactory stability of the slurry composition containing the binder composition so as to ensure satisfactory cycle characteristics of the secondary battery formed using the slurry composition for a secondary battery, the cross-linking agent (B) is preferably a multifunctional epoxy compound, more preferably, a multifunctional glycidyl ether compound. Since a multifunctional glycidyl ether compound has particularly excellent affinity to a electrolyte solution, for example, the use of a multifunctional glycidyl ether compound such as aliphatic polyglycidyl ether, aromatic polyglycidyl ether, or diglycidyl ether as the a cross-linking agent (B) particularly improves the injection property of the electrolyte solution in producing a secondary battery. Here, the "multifunctional epoxy compound" refers to a compound having two or more epoxy groups in one molecule, and the "multifunctional glycidyl ether compound" refers to a compound having two or more glycidyl ether groups in one molecule.

Such a cross-linking agent (B) may be used alone or in combination of two or more thereof in any proportion.

Further, the viscosity of a 1% by mass aqueous solution of the cross-linking agent (B) is preferably 5000 mPa·s or less, more preferably 700 mPa·s or less, particularly preferably 150 mPa·s or less. The use of the cross-linking agent of the 1% by mass aqueous solution having a viscosity within the above range makes it possible to achieve excellent adherence between a negative electrode mix layer and a current collector. The viscosity of the 1% by mass aqueous solution of the cross-linking agent (B) can be measured by the same method as the above method for measuring the viscosity of the 1% by mass aqueous solution of carboxymethyl cellulose.

The cross-linking agent (B) is preferably water-soluble. With the cross-linking agent (B) being water-soluble, the cross-linking agent (B) can be prevented from being unevenly distributed in an aqueous slurry composition containing the binder composition and the obtained negative electrode mix layer can form a suitable crosslinking structure. This ensures satisfactory adhesion strength between the negative electrode mix layer and the current collector in the obtained secondary battery, and can improve the electrical characteristics such as the initial coulombic efficiency, rate characteristics, and cycle characteristics.

Here, in this specification, a cross-linking agent being "water-soluble" means the following. When a mixture obtained by adding 1 part by mass (solid content equivalent) of the cross-linking agent to 100 parts by mass of ion-exchanged water is stirred and conditioned to meet one of the conditions satisfying the range of temperature of 20° C. to 70° C. and the range of pH of 3 to 12 (NaOH aqueous solution and/or HCl aqueous solution are used for pH adjustment) and is passed through a screen of mesh size 250; the mass of the solid content of the residue left on the screen does not exceed 50% by mass with respect to the solid content of the added cross-linking agent. Note that even if a mixture of the above cross-linking agent and water is in an emulsion form which separates into two phases when left to stand, the cross-linking agent is regarded as being water-soluble as long as the above definition is satisfied.

The water solubility of the cross-linking agent (B) is preferably 80% by mass or more and more preferably 90% by mass or more for the same reason as the above cross-linking agent being water-soluble. The "water solubility" of the cross-linking agent (B) is defined by the following expression. Here, 1 part by mass (solid content equivalent) of the cross-linking agent is added to 100 parts by mass of ion-exchanged water and stirred and the thus obtained mixture is adjusted to 25° C. and pH 7, and is passed through a screen of mesh size 250; and the ratio of the mass of the solid content of the residue left on the screen is X % by mass with respect to the mass of the solid content of the added cross-linking agent.

$$\text{Water solubility} = (100-X)\% \text{ by mass}$$

<Particulate Polymer (C)>

A particulate polymer (C) having a functional group reacting with the cross-linking agent (B) and includes an aliphatic conjugated diene monomer unit and an aromatic vinyl monomer unit (hereinafter may be abbreviated as "particulate polymer (C)") is a component that can retain components (for example, an electrode active material) contained in an electrode member (for example, a negative electrode), which is formed using the slurry composition containing the disclosed binder composition for a second battery, and thus can prevent those components from being separated from the electrode member. In the case where the electrode member is a negative electrode and a negative electrode mix layer is formed using the slurry composition, when immersed in an electrolyte solution, the particulate polymer in the negative electrode mix layer generally remains in the particulate form while absorbing the electrolyte solution and swelling, and binds the negative electrode active materials, thereby preventing the negative electrode active material from coming off the current collector. The particulate polymer also serves to keep the strength of the negative electrode mix layer by also binding particles other than the negative electrode active material contained in the negative electrode mix layer.

Note that the phrase "containing monomer units" herein means that "a polymer obtained using the monomer includes a structural unit derived from the monomer".

The particulate polymer (C) used in this disclosure has a functional group reacting with the cross-linking agent (B) and also has an aliphatic conjugated diene monomer unit and an aromatic vinyl monomer unit. The particulate polymer (C) having a functional group reacting with the cross-linking agent (B) allows crosslinks to be formed between the particulate polymers (C) and between the water-soluble thickener (A) and the particulate polymer (C). Further, the particulate polymer (C) is a copolymer having an aliphatic conjugated diene monomer unit and an aromatic vinyl monomer unit. The aliphatic conjugated diene monomer unit is a flexible repeating unit having low rigidity and is capable of increasing binding capacity. The aromatic vinyl monomer unit is capable of increasing the stability of the particulate polymer (C) in an electrolyte solution by reducing the solubility of the polymer in the electrolyte solution.

Here, the disclosed binder composition for a secondary battery necessarily contains 10 parts by mass or more or and less than 500 parts by mass of the particulate polymer (C) per 100 parts by mass of the water-soluble thickener (A). The content is preferably 50 parts by mass or more, more preferably 80 parts by mass, particularly preferably 100 parts by mass or more and preferably 300 parts by mass or less, more preferably 250 parts by mass or less, particularly preferably 200 parts by mass or less. The binder composition for a secondary battery containing 10 parts by mass or more of the particulate polymer (C) per 100 parts by mass of the water-soluble thickener (A) makes it possible to form a good crosslinking structure and to ensure satisfactory binding capacity. This ensures satisfactory strength of the negative electrode mix layer obtained using the binder composition and sufficiently suppresses the expansion of the negative electrode. Further, satisfactory adherence can be ensured between the negative electrode mix layer and the current collector. Further, the binder composition for a secondary battery containing less than 500 parts by mass or more of the particulate polymer (C) per 100 parts by mass of the water-soluble thickener (A) can ensure sufficient injection property of the electrolyte solution and also can suppress increase in the internal resistance of an electrode. Furthermore, impurities such as an emulsifier remaining in the particulate polymer (C) can be prevented from being mixed into the electrolyte solution. This can prevent the electrical characteristics such as the cycle characteristics from being deteriorated.

Note that the "particulate polymer" is a polymer dispersible in an aqueous solvent such as water and is present in the form of particles in the aqueous solvent. In general, for the particulate polymer, when 0.5 g of the particulate polymer is dissolved in 100 g of water at 25° C., the content of the insoluble matter is 90% by mass or more.

Here, examples of the functional group reacting with the cross-linking agent (B) in the particulate polymer (C) include a carboxy group, a hydroxy group, a glycidyl ether group, and a thiol group. Of these, in terms of electrical characteristics such as cycle characteristics of a secondary battery obtained using the disclosed binder composition for a secondary battery, the particulate polymer (C) preferably has a carboxy group, a hydroxy group, and a thiol group, and more preferably has a carboxy group and a hydroxy group. Further, it is particularly preferable that the particulate polymer (C) has both a carboxy group and a hydroxy group in terms both achieving electrical characteristics such as rate characteristics and cycle characteristics, and suppressing the expansion of the negative electrode caused due to charge and discharge.

Examples of an aliphatic conjugated diene monomer that can constitute the aliphatic conjugated diene monomer units of the particulate polymer (C) include, but are not limited in particular to, 1,3-butadiene, 2-methyl-1,3-butadiene, 2,3-dimethyl-1,3-butadiene, 2-chloro-1,3-butadiene, substituted straight-chain conjugated pentadienes, and substituted and side chain conjugated hexadienes. Of those, 1,3-butadiene is preferred. Note that the aliphatic conjugated diene monomer can be used alone or in combination of two or more thereof in any proportion.

The content percentage of the aliphatic conjugated diene monomer units contained in the particulate polymer (C) is preferably 20% by mass or more, more preferably 30% by mass or more, and preferably 70% by mass or less, more preferably 60% by mass or less, particularly preferably 55% by mass or less. The content percentage of the aliphatic conjugated diene monomer units being 20% by mass or more can increase the flexibility of the negative electrode. Whereas the content percentage being 70% by mass or less makes it possible to achieve good adherence between the negative electrode mix layer and the current collector and also improve the electrolyte resistance of the negative electrode obtained using the disclosed binder composition for a secondary battery.

Further, examples of an aromatic vinyl monomer that can form the aromatic vinyl monomer units of the particulate polymer (C) include, but not limited to, styrene, α-methyl-styrene, vinyltoluene, and divinylbenzene. Of these, styrene is preferred. Note that the aromatic vinyl monomer can be used alone or in combination of two or more thereof in any proportion.

The content percentage of the aromatic vinyl monomer units contained in the particulate polymer (C) is preferably 30% by mass or more, more preferably 35% by mass or more, and preferably 79.5% by mass or less, more preferably 69% by mass or less. The content percentage of the aromatic vinyl monomer units being 30% by mass or more can improve the electrolyte resistance of the negative electrode obtained using the disclosed binder composition for a secondary battery. Whereas the content percentage being 79.5% by mass or less makes it possible to achieve good adherence between the negative electrode mix layer and the current collector.

The particulate polymer (C) preferably contains 1,3-butadiene units as the aliphatic conjugated diene monomer units and contain styrene units as the aromatic vinyl monomer units. In other words, the particulate polymer (C) is preferably a styrene-butadiene copolymer.

Here, the particulate polymer (C) necessarily has a functional group reacting with the cross-linking agent (B). Specifically, the particulate polymer (C) necessarily has monomer units containing a functional group reacting with the cross-linking agent (B). Examples of the monomer units containing a functional group reacting with the cross-linking agent (B) include ethylenic unsaturated carboxylic acid monomer units, unsaturated monomer units having a hydroxy group, unsaturated monomer units having a glycidyl ether group, and monomer units having a thiol group.

Examples of the ethylenic unsaturated carboxylic acid monomer that can be used for the production of the particulate polymer (C) having a carboxylic acid group as the functional group reacting with the cross-linking agent (B) include monocarboxylic acid and dicarboxylic acid such as acrylic acid, methacrylic acid, crotonic acid, maleic acid, fumaric acid, and itaconic acid; and anhydrides thereof. Of these, in terms of the stability of the disclosed slurry composition, acrylic acid, methacrylic acid, and itaconic acid are preferred as the ethylenic unsaturated carboxylic acid monomer. Note that these monomers can be used alone or in combination of two or more thereof in any proportion.

Examples of the unsaturated monomer having a hydroxy group that can be used for the production of the particulate polymer (C) having a hydroxy group as the functional group reacting with the cross-linking agent (B) include, for example, 2-hydroxyethyl acrylate, 2-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol) maleate, di(ethylene glycol) itaconate, 2-hydroxyethyl maleate, bis(2-hydroxyethyl) maleate, and 2-hydroxyethyl methyl fumarate. Of these, 2-hydroxyethyl acrylate is preferred. Note that these monomers can be used alone or in combination of two or more thereof in any proportion.

Examples of the unsaturated monomer having a glycidyl ether group that can be used for the production of the particulate polymer (C) having a glycidyl ether group as the functional group reacting with the cross-linking agent (B) include, for example, glycidyl acrylate and glycidyl methacrylate. Of these, glycidyl methacrylate is preferred. Note that these monomers can be used alone or in combination of two or more thereof in any proportion.

Examples of the monomer having a thiol group that can be used for the production of the particulate polymer (C) having a thiol group as the functional group reacting with the cross-linking agent (B) include, for example, pentaerythritol tetrakis(3-mercaptobutyrate), trimethylolpropane tris(3-mercaptobutyrate), and trimethylolethane tris(3-mercaptobutyrate). Of these, pentaerythritol tetrakis(3-mercaptobutyrate) is preferred. Note that these monomer can be used alone or in combination of two or more thereof in any proportion.

The functional group reacting with the cross-linking agent (B) in the particulate polymer (C) may be introduced by using the above-described monomer containing a functional group reacting with the cross-linking agent (B) for polymerization. Alternatively, it may be introduced, for example, after the polymerization for obtaining particulate polymer having no functional group(s) reacting with the cross-linking agent (B), part or all of the functional groups in the particulate polymer may be substituted with the functional group reacting with the cross-linking agent (B). Thus, the particulate polymer (C) may be prepared. Note that repeating units in the particulate polymer (C) having a "functional group reacting with the cross-linking agent (B)" introduced in the above-described manner is also regarded as the "monomer unit containing a functional group reacting with the cross-linking agent (B)".

The content percentage of the monomer containing a functional group reacting with the cross-linking agent (B) in the particulate polymer (C) may have an upper limit of preferably 10% by mass or less, more preferably 8% by mass or less, and particularly preferably 5% by mass or less, and a lower limit of preferably 0.5% by mass or more, more preferably 1.0% by mass or more, and particularly preferably 1.5% by mass or more, but not particularly limited thereto. When the content percentage of the monomer is within the above range, the obtained particulate polymer (C) has excellent mechanical stability and chemical stability.

Further, the particulate polymer (C) may contain a given repeating unit in addition to the ones mentioned above as long as the intended effect is not significantly compromised. Examples of a monomer corresponding to the given repeating unit include a vinyl cyanide-based monomer, an unsaturated carboxylic acid alkylester monomer, and an unsaturated carboxylic acid amide monomer. Note that these monomers can be used alone or in combination of two or more thereof in any proportion. The content percentage of the monomer(s) corresponding to the given repeating unit(s) in the particulate polymer (C) may have an upper limit of preferably 10% by mass or less, more preferably 8% by mass or less, particularly preferably 5% by mass or less, and a lower limit of preferably 0.5% by mass or more, more preferably 1.0% by mass or more, particularly preferably 1.5% by mass or more, in total, but not particularly limited thereto.

Examples of the vinyl cyanide-based monomer include acrylonitrile, methacrylonitrile, α-chloroacrylonitrile, and α-ethylacrylonitrile. Of these, acrylonitrile and methacrylonitrile are preferred. Note that these monomers can be used alone or in combination of two or more thereof in any proportion.

Examples of the unsaturated carboxylic acid alkylester monomer include methyl acrylate, methyl methacrylate, ethyl acrylate, ethyl methacrylate, butyl acrylate, dimethyl fumarate, diethyl fumarate, dimethyl maleate, diethyl maleate, dimethyl itaconate, monomethyl fumarate, monoethyl fumarate, and 2-ethylhexyl acrylate. Of these, methyl methacrylate is preferred. Note that these monomers can be used alone or in combination of two or more thereof in any proportion.

Examples of the unsaturated carboxylic acid amide monomer include acrylamide, methacrylamide, N-methylolacrylamide, N-methylolmethacrylamide, and N,N-dimethylacrylamide. Of these, acrylamide and methacrylamide are preferred. Note that these monomers can be used alone or in combination of two or more thereof in any proportion.

Further, the particulate polymer (C) may be produced using a monomer used for normal emulsion polymerization, for example, ethylene, propylene, vinyl acetate, vinyl propionate, vinyl chloride, or vinylidene chloride. Note that these monomers can be used alone or in combination of two or more thereof in any proportion.

The content percentage of the monomer(s) corresponding to the given repeating unit(s) other than the aliphatic conjugated diene monomer unit, the aromatic vinyl monomer unit, and the monomer unit containing a functional group reacting with the cross-linking agent (B) in the particulate polymer (C) may have an upper limit of preferably 20% by mass or less, more preferably 10% by mass or less, particularly preferably 8% by mass or less, and a lower limit of preferably 0.5% by mass or more, more preferably 1.0% by mass or more, particularly preferably 1.5% by mass or more, in total, but not particularly limited thereto.

The gel content of the particulate polymer (C) is preferably 50% by mass or more, more preferably 80% by mass or more, and preferably 98% by mass or less, more preferably 95% by mass or less. When the gel content of the particulate polymer (C) is less than 50% by mass, the cohesive force of the particulate polymer (C) decreases, which would result in insufficient adhesion strength to a current collector or the like. On the other hand, when the gel content of the particulate polymer (C) is more than 98% by mass, the particulate polymer (C) loses its toughness to become brittle, which would result in insufficient adhesion strength.

Note that the "gel content" of the particulate polymer (C) can be determined by a measurement method described in the Examples of this disclosure.

The glass-transition temperature (Tg) of the particulate polymer (C) is preferably −30° C. or more, more preferably −20° C. or more, and preferably 80° C. or less, more preferably 30° C. or less. The particulate polymer (C) with a glass-transition temperature of −30° C. or more prevents ingredients in the slurry composition containing the disclosed binder composition for a secondary battery from coagulation and sedimentation, thereby ensuring the stability of the slurry composition. Moreover, the expansion of the negative electrode can be suitably suppressed. Further, the particulate polymer (C) with a glass-transition temperature of 80° C. or less makes it possible to achieve good workability in applying the slurry composition containing the disclosed binder composition for a secondary battery, onto a current collector or the like.

Note that the "glass-transition temperature" of the particulate polymer (C) can be measured using the measurement method described in the disclosed examples.

The particulate polymer (C) is produced, for example, by polymerizing a monomer composition containing the above-described monomer in an aqueous solvent.

Here, the content percentages of the monomers in a monomer composition are generally made to be the same as the content percentages of the corresponding repeating units in the desired particulate polymer (C).

The aqueous solvent is not limited in particular as long as the particulate polymer (C) can be dispersed therein in the particulate form. In general, it is selected from aqueous solvents having a boiling point at atmospheric pressure of normally 80° C. or more and preferably 100° C. or more, and normally 350° C. or less and preferably 300° C. or less.

Specifically, examples of the aqueous solvent include water; ketones such as diacetone alcohol and γ-butyrolactone; alcohols such as ethyl alcohol, isopropyl alcohol, and normal propyl alcohol; glycol ethers such as propylene glycol monomethyl ether, methyl cellosolve, ethyl cellosolve, ethylene glycol tertiary butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; ethers such as 1,3-dioxolane, 1,4-dioxolane, and tetrahydrofuran. Of these, water is particularly preferred, since it is not flammable and a dispersion of the particles of the particulate polymer (C) can easily be obtained. Note that using water as the main solvent, the above aqueous solvents other than water may be mixed therewith provided that a satisfactory dispersed state of the particles in the particulate polymer (C) can be ensured.

The polymerization method is not limited in particular. For example, any of the methods including solution polymerization, suspension polymerization, bulk polymerization, and emulsion polymerization can be used. Alternatively, the polymerization method may be any of the methods including ionic polymerization, radical polymerization, and living radical polymerization. In terms of the production efficiency, emulsion polymerization is particularly preferred. For example, a polymer with high molecular weight can be obtained easily; and since a polymer can be obtained with the polymerized product being dispersed as is in water, so that it can be directly used without the necessity for redispersion, for the production of the disclosed binder composition for a secondary battery or the disclosed slurry composition for a secondary battery. Note that the emulsion polymerization can be performed by a conventional method.

The polymerization can be performed using an emulsifier, a dispersant, a polymerization initiator, a polymerization aid, and the like which are commonly used, and the amount used is also the amount commonly used. For the polymerization, seed polymerization may be performed by employing seed particles. Further, any polymerization conditions can be selected depending on the polymerization method, the kind of the polymerization initiator, and the like.

Here, the aqueous dispersion of the particles of the particulate polymer (C) obtained by the above-described polymerization method may be adjusted to the pH range of generally 5 to 10, preferably 5 to 9 with the use of a basic aqueous solution containing, for example, hydroxides of alkali metals (for example, Li, Na, K, Rb, and Cs), ammonia, inorganic ammonium compounds (for example, $NH_4Cl$ and the like), organic amine compounds (for example, ethanolamine, diethylamine, and the like), and the like. In particular, the pH adjustment using an alkali metal hydroxide is preferred, since the adherence between a current collector and a negative electrode active material is improved.

Note that the glass-transition temperature and the gel content of the particulate polymer (C) can be adjusted as appropriate by changing the conditions for preparing the particulate polymer (C) (for example, the monomers used, polymerization conditions used, and the like).

The glass-transition temperature can be adjusted by changing the kind and the amount of the monomer used. For example, using a monomer such as styrene or acrylonitrile, the glass-transition temperature can be increased, whereas using a monomer such as butyl acrylate or butadiene, the glass-transition temperature can be reduced.

The gel content can be adjusted by changing the polymerization temperature, the kind of the polymerization initiator, the kind and the amount of a molecular weight regulator, the conversion at the time when the reaction stops, and the like. For example, the gel content can be increased by reducing the chain transfer agent, whereas the gel content can be reduced by increasing the chain transfer agent.

In the disclosed binder composition and slurry composition, the particulate polymer (C) has a number average particle size of preferably 50 nm or more, more preferably 70 nm or more, and preferably 500 nm or less, more preferably 400 nm or less. With the number average particle size being within the above range, the obtained negative electrode can have good strength and flexibility. Note that the number average particle size can easily be measured by transmission electron microscopy, using a Coulter counter, by laser diffraction scattering, or the like.

(Slurry Composition for Secondary Battery)

The slurry composition for a secondary battery of this disclosure comprises: a water-soluble thickener (A) having a hydroxy group or a carboxy group; a cross-linking agent (B) having a functional group reacting with the hydroxy group or the carboxy group of the water-soluble thickener (A); a particulate polymer (C); an electrode active material; and water. The particulate polymer (C) has a functional group reacting with the cross-linking agent (B) and includes an aliphatic conjugated diene monomer unit and an aromatic vinyl monomer unit. The disclosed slurry composition for a secondary battery contains 0.001 part by mass or more and less than 100 parts by mass of the cross-linking agent (B) and 10 parts by mass or more and less than 500 parts by mass of the particulate styrene-butadiene copolymer (C), each per 100 parts by mass of the water-soluble thickener (A).

Here, the water-soluble thickener (A), the cross-linking agent (B), and the particulate polymer (C) included in the disclosed slurry composition for a secondary battery can be the same as the respective ones described in the above section describing the binder composition for a secondary battery of this disclosure.

<Electrode Active Material>

An electrode active material is a substance that receives and delivers electrons in electrodes (positive electrode and negative electrode) in a secondary battery. A description is now made by giving examples of an electrode active material (negative electrode active material) used in a negative electrode of a lithium ion secondary battery.

For a negative electrode active material of a lithium ion secondary battery, a material is generally used which can make lithium intercalation and deintercalation possible. Examples of the material that can make lithium intercalation and deintercalation possible include a carbon-based negative electrode active material, a metal-based negative electrode active material, and a negative electrode active material obtained by combining them.

A carbon-based negative electrode active material refers to an active material having carbon as the backbone, into which insertion (or "doping") of lithium is possible. Examples of the carbon-based negative electrode active material include carbonaceous materials and graphitic materials.

A carbonaceous material is a less graphitized (or low crystallinity) material, which can be obtained by carbonizing a carbon precursor by heat-treating it at 2000° C. or less. Note that the lower limit of the heating temperature in the carbonization is not limited in particular, and it can be, for example, 500° C. or more.

Examples of the carbonaceous material include easily graphitizable carbon of which carbon structure can easily be changed by the heating temperature, and less graphitizable carbon typified by glassy carbon, which has a structure similar to the amorphous structure.

Here, examples of easily graphitizable carbon include a carbon material made from tar pitch that can be obtained from oil or coal. Specific examples of easily graphitizable carbon include coke, mesocarbon microbeads (MCMB), mesophase pitch-based carbon fiber, and pyrolytic vapor grown carbon fiber.

Examples of less graphitizable carbon include baked phenolic resin, polyacrylonitrile-based carbon fiber, pseudo-isotropic carbon, baked furfuryl alcohol resin (PFA), and hard carbon.

The graphitic material is a material having as high crystallinity as graphite. The graphitic material can be obtained by heat-treating easily graphitizable carbon at 2000° C. or more. Note that the upper limit of the heating temperature is not limited in particular, and it ca be 5000° C. or less.

Examples of the graphitic material include natural graphite and artificial graphite.

Examples of artificial graphite include an artificial graphite obtained by heat-treating carbon containing easily graphitizable carbon mainly at 2800° C. or more, graphitized MCMB obtained by heat-treating MCMB at 2000° C. or more, and graphitized mesophase pitch-based carbon fiber obtained by heat-treating mesophase pitch-based carbon fiber at 2000° C. or more.

A metal-based negative electrode active material is an active material containing metal, which generally contains in its structure elements into which lithium can be inserted, and has a theoretical electric capacity of 500 mAh/g or more per unit mass with lithium being inserted. For the metal-based active material, for example, lithium metal, an elementary metal that can be used to form lithium alloys (for example, Ag, Al, Ba, Bi, Cu, Ga, Ge, In, Ni, P, Pb, Sb, Si, Sn, Sr, Zn, Ti, and the like) and alloys thereof; and oxides, sulfides, nitrides, silicides, carbides, and phosphides thereof can be used.

Of metal-based negative electrode active materials, active materials containing silicon (silicon-based negative electrode active materials) are preferred. The use of a silicon-based negative electrode active material results in the increased capacity of lithium ion secondary batteries.

Examples of silicon-based negative electrode active materials include silicon (Si); alloys of silicon with cobalt, nickel, iron, and the like; SiO; $SiO_x$; a mixture of a Si-containing material and a carbon material; and a composite of a Si-containing material and conductive carbon, obtained by coating or combining the Si-containing material with conductive carbon.

Here, $SiO_x$ is a compound containing Si and at least one of SiO and $SiO_2$, where x is generally 0.01 or more and less than 2. $SiO_x$ can be formed for example using a disproportionation reaction of silicon monoxide (SiO). Specifically, $SiO_x$ can be prepared by heat-treating SiO optionally with the presence of a polymer such as polyvinyl alcohol to form silicon and silicon dioxide. The heat treatment can be performed, after grinding and mixing SiO and optionally the polymer, at a temperature of 900° C. or more, preferably 1000° C. or more in an atmosphere containing organic gas and/or steam.

Examples of the mixture of a Si-containing material and a carbon material include a mixture obtained by grinding and mixing a Si-containing material such as silicon or $SiO_x$ with a carbon material such as a carbonaceous material or a graphitic material optionally with the presence of a polymer such as polyvinyl alcohol. For the carbonaceous material or the graphitic material, materials that may be used as a carbon-based negative electrode active material can be used.

The composite of a Si-containing material and conductive carbon may be, for example, a compound obtained, for example, by heat-treating a ground mixture of SiO, a polymer such as polyvinyl alcohol, and optionally a carbon material in an atmosphere containing organic gas and/or steam. Further, a well-known method can be used, such as a method of coating the surface of particles of SiO with organic gas or the like by chemical vapor deposition, or a method of forming composite particles (granulation) using particles of SiO and graphite or artificial graphite by a mechanochemical process.

Here, when a carbon-based negative electrode active material or a metal-based negative electrode active material is used as the negative electrode active material, the negative electrode active material expands and contracts upon charge and discharge. Therefore, when such a negative electrode active material is used, commonly, the negative electrode gradually expands due to the expansion and contraction of the negative electrode active material, which would lead to the deformation of the secondary battery. Thus, the electrical characteristics such as the cycle characteristics would be deteriorated. However, in a negative electrode formed using the binder composition for a secondary battery of this disclosure, the above-described crosslinking structure formed from the water-soluble thickener (A), the cross-linking agent (B), and the particulate polymer (C) suppresses the expansion of the negative electrode due to the expansion and contraction of the negative electrode active material, thereby improving the electric al characteristics such as the cycle characteristics.

Although the use of the above silicon-based negative electrode active material results in the increased capacity of lithium ion secondary batteries, a silicon-based negative electrode active material generally expands and contracts greatly (for example, to five times) upon charge and discharge. With this being the circumstances, in terms of increasing the capacity of a lithium ion secondary battery while sufficiently suppressing the expansion of the negative electrode, a mixture of a carbon-based negative electrode active material and a silicon-based negative electrode active material is preferably used as the negative electrode active material.

When the mixture of a carbon-based negative electrode active material and a silicon-based negative electrode active material is used as the negative electrode active material, in terms of sufficiently increasing the capacity of a lithium ion secondary battery while sufficiently suppressing the expansion of the negative electrode, artificial graphite is preferably used as the carbon-based negative electrode active material; one or more selected from the group consisting of Si, $SiO_x$, a mixture of a Si-containing material and a carbon material, and a composite of a Si-containing material and conductive carbon are preferably used as the silicon-based negative electrode active material; more preferably, a composite of a Si-containing material and conductive carbon is more preferably used as the silicon-based negative electrode active material; and a composite in which $SiO_x$ is dispersed in a matrix of conductive carbon (Si—$SiO_x$—C complex) is particularly preferably used. While such a negative electrode active material makes the intercalation and deintercalation of a relatively large amount of lithium possible, the change in the volume after the intercalation and deintercalation of lithium is relatively small. Accordingly, the use of such a negative electrode active material can sufficiently increase the capacity of a lithium ion secondary battery using the negative electrode for a lithium ion secondary battery, the negative electrode being formed using the slurry composition, while suppressing the increase in the change in the volume of the negative electrode active material at times of charge and discharge.

When a mixture of a carbon-based negative electrode active material and a silicon-based negative electrode active material is used as the negative electrode active material, in terms sufficiently increasing the capacity of a lithium ion secondary battery while sufficiently suppressing the expansion of the negative electrode, the negative electrode active material contains preferably more than 0 parts by mass and 100 parts by mass or less, more preferably 10 parts by mass or more and 70 parts by mass or less, and particularly preferably 30 parts by mass and 50 parts by mass or less of the silicon-based negative electrode active material per 100 parts by mass of the carbon-based negative electrode active material. The negative electrode active material containing a silicon-based negative electrode active material (in other words, the amount of the silicon-based negative electrode active material being more than 0 parts by mass per 100 parts by mass of the carbon-based negative electrode active material) can sufficiently increase the capacity of the lithium ion secondary battery. Further, the amount of the silicon-based negative electrode active material being 100 parts by mass or less per 100 parts by mass of the carbon-based negative electrode active material can sufficiently suppress the expansion of the negative electrode.

The particle size and the specific surface area of the negative electrode active material may be, but not limited to, the same as those of the conventionally used negative electrode active material.

The disclosed slurry composition for a secondary battery contains preferably 5000 parts by mass or more, more preferably 8000 parts by mass or more, and preferably 15000 parts by mass or less, more preferably 12000 parts by mass or less of the negative electrode active material per 100 parts by mass of the water-soluble thickener (A).

When the slurry composition for a secondary battery contains preferably 5000 parts by mass or more of the negative electrode active material per 100 parts by mass of the water-soluble thickener (A), the negative electrode of a secondary battery obtained using the slurry composition for a secondary battery makes possible the sufficient electron exchange, which results in good operation of a secondary battery. When the slurry composition for a secondary battery contains 15000 parts by mass or less of the negative electrode active material per 100 parts by mass of the water-soluble thickener (A), the expansion of the negative electrode can be suppressed and satisfactory workability in applying the slurry composition to a current collector can be ensured.

<Additional Components>

The slurry composition of this disclosure may further contain a conductive agent, a reinforcing material, a leveling agent, and an additive for an electrolyte solution in addition to the above-described components. The additional components are not limited in particular as long as they do not affect the cell reaction, well-known components, for example, ones described in WO 2012/115096 A can be used. Those components can be used alone or in combination of two or more thereof in any proportion. Further, the binder composition for a secondary battery of this disclosure may contain those additional components.

<Preparation of Slurry Composition>

The slurry composition of this disclosure may be prepared by dispersing the above-described components in a water medium used as a dispersion medium. Alternatively, the slurry composition may be prepared by preparing the disclosed binder composition containing the water-soluble thickener (A), the cross-linking agent (B), and the particulate polymer (C) and then dispersing the binder composition and the electrode active material in a water medium used as a dispersion medium. In terms of the dispersibility of the components in the slurry composition, it is preferable to disperse the above-described components in a water medium used as a dispersion medium, thereby preparing the slurry composition containing the water-soluble thickener (A), the cross-linking agent (B), and the particulate polymer (C) (i.e., containing the binder composition of this disclosure). Specifically, the slurry composition is preferably prepared by mixing the above-described components and the water medium with the use of a mixer such as a ball mill, a sand mill, a bead mill, a pigment disperser, a grinding machine, an ultrasonic disperser, a homogenizer, a planetary mixer, or FILMIX.

Water is typically used as the water medium; alternatively, an aqueous solution of any compound or a mixed solution of a small amount of organic medium and water may be used. The solid content concentration of the slurry composition may be for example 30% by mass or more and 90% by mass or less, more preferably 40% by mass or more and 80% by mass or less, which allows the components to be uniformly dispersed. Further, the mixing of the above-described components and the water medium can typically be performed at a temperature range from room temperature to 80° C. for 10 minutes to several hours.

(Negative Electrode for Secondary Battery)

The negative electrode for a secondary battery of this disclosure can be produced using the composition for a secondary battery of this disclosure.

Further, the negative electrode for a secondary battery of this disclosure includes a current collector and a negative electrode mix layer formed on the current collector. The negative electrode mix layer can be obtained from the disclosed slurry composition for a secondary battery in which the electrode active material is a negative electrode active material.

The negative electrode for a secondary battery of this disclosure is produced for example through a step of applying the above-described slurry composition for a secondary battery onto a current collector (application step), and a step of drying the slurry composition for a secondary battery applied onto the current collector to form a negative electrode mix layer (drying step), and an optional step of further heating the negative electrode mix layer (heating step). When this production method is used, for example, the heat applied in the drying step and the heat applied in the heating step promote the crosslinking reaction via the cross-linking agent (B). Accordingly, a crosslinking structure is formed in the negative electrode mix layer between the water-soluble thickeners (A), between the water-soluble thickener (A) and the particulate polymer (C), and between the particulate polymers (C). This crosslinking structure can suppress the expansion caused by charge and discharge and improves the adherence between the current collector and the negative electrode mix layer, which can further improve the electrical characteristics of a secondary battery, such as the initial coulombic efficiency, rate characteristics, and cycle characteristics.

Furthermore, when the crosslinking structure is formed, the water-soluble thickener (A), the cross-linking agent (B), and the particulate polymer (C) that are incorporated in the crosslinking structure become hardly dissolved or dispersed in water, so that the water resistance of the negative electrode is improved. In the related art, there are cases where a porous membrane is provided on polar plates having an electrode active material layer obtained using an aqueous slurry composition, for the purpose of for example improving the strength. In such cases, when an aqueous composition is used as a slurry composition for a porous membrane, upon the application of the slurry composition for a porous membrane onto an electrode active material layer, water-soluble components such as a water-soluble thickener contained in the electrode active material layer are dissolved in the slurry composition for a porous membrane, which would result in the deteriorated characteristics of a battery. By contrast, the negative electrode formed from the slurry composition for a secondary battery of this disclosure improves water resistance as described above, thus ensuring sufficiently satisfactory characteristics of the battery even when the porous membrane formed from an aqueous slurry composition for a porous membrane is provided on the negative electrode mix layer.

[Application Step]

The above-described slurry composition for a secondary battery can be applied onto the current collector by any well-known method. Specifically, the slurry composition may be applied for example by doctor blading, dip coating, reverse roll coating, direct roll coating, gravure coating, extrusion coating, or brush coating. On that occasion, the slurry composition may be applied only to one surface of the current collector or may be applied to both surfaces thereof. The thickness of the slurry coating applied onto the current collector before drying may be appropriately determined in accordance with the thickness of the negative electrode mix layer to be obtained after drying.

Here, for the current collector to which the slurry composition is applied, a material is used, which is electrically conductive and electrochemically durable. Specifically, the current collector may use a current collector made of for example, iron, copper, aluminum, nickel, stainless steel, titanium, tantalum, gold, or platinum. Of these, copper foil is preferred as the current collector used for a negative electrode. The above materials can be used alone or in combination of two or more thereof in any proportion.

[Drying Step]

The slurry composition applied onto the current collector may be dried by any well-known method, for example, drying by warm, hot, or low-humidity air; drying in a vacuum; or drying by illumination of infrared light or electron beams. The slurry composition on the current collector dried as such forms a negative electrode active material layer on the current collector, thereby providing the negative electrode for a secondary battery that includes the current collector and the negative electrode mix layer. When the slurry composition is dried, the heat applied promotes the crosslinking reaction via the cross-linking agent (B). The drying temperature is not limited in particular and is preferably 50° C. or more and less than 150° C., more preferably 60° C. or more and less than 140° C., and particularly preferably 70° C. or more and less than 130° C.

After the drying step, the negative electrode mix layer may be further subjected to a pressure treatment by mold pressing, roll pressing, or the like. The pressure treatment improves the adherence between the negative electrode mix layer and the current collector. The density of the negative electrode mix layer after the pressure treatment is not limited in particular. However, in terms of the characteristics such as the cell capacity and the resistance, the density is preferably 1.30 g/cm$^3$ or more and less than 1.85 g/cm$^3$, more preferably 1.40 g/cm$^3$ or more and less than 1.75 g/cm$^3$.

After the formation of the negative electrode mix layer, a heating step is preferably performed to promote the crosslinking reaction, thereby obtaining an even more sufficient crosslinking structure. The heating step is preferably performed at 80° C. to 160° C. for approximately 1 hour to 20 hours.

(Secondary Battery)

The secondary battery of this disclosure includes a positive electrode, a negative electrode, an electrolyte solution, and a separator, in which the negative electrode used is the negative electrode for a secondary battery of this disclosure. Since the disclosed negative electrode for a secondary battery is used in the secondary battery of this disclosure, the expansion of the negative electrode due to the repetition of charge and discharge can be suppressed; satisfactory adherence between the negative electrode mix layer and the current collector can be ensured; and excellent electrical characteristics can be achieved.

<Positive Electrode>

For a positive electrode of the secondary battery, when the secondary battery is, for example, a lithium ion secondary battery, a known positive electrode used as the positive electrode of a lithium ion secondary battery can be used. Specifically, the positive electrode used may be, for example, a positive electrode obtained by forming a positive electrode mix layer on a current collector.

The current collector used may be made of a metal material such as aluminum. The positive electrode mix layer used may be a layer including a known positive electrode active material, a conductive agent, and a binder. The binder may be the binder composition for a secondary battery of this disclosure. The density of the positive electrode mix layer is not limited in particular. However, in terms of the characteristics such as the cell capacity and the resistance, the density is preferably 2.50 g/cm$^3$ or more and less than 3.80 g/cm$^3$, more preferably 3.00 g/cm$^3$ or more and less than 3.60 g/cm$^3$.

<Electrolyte Solution>

The electrolyte solution used may be formed by dissolving an electrolyte in a solvent.

The solvent used may be an organic solvent in which the electrolyte can be dissolved. Specifically, the solvent may be an alkyl carbonate solvent to which a viscosity modifier is added. Examples of the alkyl carbonate solvent include ethylene carbonate, propylene carbonate, and γ-butyrolactone. Examples of the viscosity modifier include 2,5-dimethyltetrahydrofuran, tetrahydrofuran, diethyl carbonate, ethylmethyl carbonate, dimethyl carbonate, methyl acetate, dimethoxyethane, dioxolane, methyl propionate, and methyl formate.

A lithium salt can be used as the electrolyte. Examples of the lithium salt that may be used include ones described in JP 2012-204303 A. Of those lithium salts, LiPF$_6$, LiClO$_4$, and CF$_3$SO$_3$Li are preferred as electrolytes, since they readily dissolve in organic solvents and have a high degree of dissociation.

The electrolyte solution may be a gel electrolyte containing a polymer and the above-described electrolyte solution, or may be an intrinsic polymer electrolyte.

<Separator>

Examples of the separator that may be used include ones described in JP 2012-204303 A. Of those separators, a fine porous membrane made of polyolefinic resin (i.e., polyethylene, polypropylene, polybutene, and polyvinyl chloride) is preferred, since such a membrane can reduce the total thickness of the separator, which increases the ratio of the electrode active material in the secondary battery, consequently increasing the capacity per volume. The separator used may be a separator including a porous membrane obtained by binding non-conductive particles with the binder composition for a secondary battery of this disclosure.

<Method of Producing Secondary Battery>

The secondary battery of this disclosure is produced, for example, by stacking a positive electrode and a negative electrode with a separator provided therebetween, for example rolling or folding the resulting electrodes as necessary in accordance with the battery shape to place them in a battery container, filling the battery container with an electrolyte solution, and sealing the container. To prevent the increase in the pressure inside the lithium ion secondary battery and the occurrence of overcharge/overdischarge and the like, the lithium ion secondary battery may include an overcurrent preventing device such as a fuse or a PTC device, expanded metal, a lead plate, and the like as necessary. The secondary battery may take any shape, for example, may be shaped like a coin, a button, a sheet, a cylinder, a square, or a plane.

EXAMPLES

Hereinafter, the disclosed products and methods will be described with reference to Examples; however, this disclosure is not limited to those demonstrated in the Examples. In the following descriptions, "%" and "parts" used to express quantities are by mass, unless otherwise specified.

In the following Examples and Comparative Examples, the glass-transition temperature and the gel content of the particulate polymer (C); the initial coulombic efficiency, the rate characteristics, the cycle characteristics, and the expansion after cycles, of the secondary battery; and the adherence between the negative electrode mix layer and the current collector of the negative electrode and water resistance thereof were evaluated using the respective methods below.

<Glass-transition Temperature>

A water dispersion containing the particulate polymer (C) was dried in an environment of 50% humidity at 23° C. to 25° C. for three days to obtain a films having a thickness of 1±0.3 mm. The films were dried in a hot air oven at 120° C. for 1 hour. After that, using the dried films as samples, the glass-transition temperature (° C.) of the samples was measured in accordance with JIS K 7121 at a measurement temperature of −100° C. to 180° C., at a rate of temperature increase of 5° C./min using DSC6220 (a differential scanning calorimeter manufactured by SII NanoTechnology Inc.).

<Gel Content>

A water dispersion containing the particulate polymer (C) was prepared as an aqueous dispersion and dried in the environment of 50% humidity at 23° C. to 25° C. to be deposited to a thickness of 3±0.3 mm. The deposited film was cut into 1 mm square pieces and precisely weighed to approximately 1 g.

The mass of each cut piece of the film is designated as w0. The film pieces were immersed in 10 g of tetrahydrofuran (THF) in an environment of 25±1° C. for 24 hours. Subsequently, the film pieces pulled out of THF were vacuum dried at 105° C. for 3 hours and the mass w1 of the insoluble matter was measured.

The gel content (% by mass) was then calculated by the following expression.

$$\text{Gel content (\% by mass)} = (w1/w0) \times 100$$

<Initial Coulombic Efficiency>

A fabricated laminated cell lithium ion secondary battery was filled with an electrolyte solution and then left to stand for 5 hours. Subsequently, the battery was charged (the quantity of charge is defined as C1 (mAh)) to a cell voltage of 3.65 V by the constant-current method at 0.2 C in an atmosphere of 25° C. After that, the temperature was raised to 60° C. and aging was performed for 12 hours. The battery was then discharged (the quantity of discharge is defined as D1 (mAh)) to a cell voltage of 3.00 V by the constant-current method at 0.2 C in an atmosphere of 25° C.

Subsequently, a CC-CV charge (maximum cell voltage: 4.20 V) was performed in an atmosphere of 25° C. at a constant current of 0.2 C (the quantity of charge is defined as C2 (mAh)) and then a CC discharge (minimum voltage: 3.00 V)(the quantity of discharge is defined as D2 (mAh)) was performed in an atmosphere of 25° C. at a constant current of 0.2 C.

The initial coulombic efficiency was defined by (D1+D2)/(C1+C2)×100(%) and was evaluated on the following criteria.

A: Initial coulombic efficiency: 93.5% or more
B: Initial coulombic efficiency: 93.0% or more and less than 93.5%
C: Initial coulombic efficiency: 92.5% or more and less than 93.0%
D: Initial coulombic efficiency: less than 92.5%

<Rate Characteristics>

A fabricated laminated cell lithium ion secondary battery was filled with an electrolyte solution and then left to stand for 5 hours. Subsequently, the battery was charged to a cell voltage of 3.65 V by the constant-current method at 0.2 C in an atmosphere of 25° C. After that, the temperature was raised to 60° C. and aging was performed for 12 hours. The battery was then discharged to a cell voltage of 3.00 V by the constant-current method at 0.2 C in an atmosphere of 25° C.

Subsequently, a charge was performed to a charge voltage of 4.20 V at a rate of 0.2 C, and a discharge was performed to a voltage of 3.00 V at rates of 0.2 C and 2.0 C, each in an atmosphere of 25° C. On that occasion, the discharge capacities at the discharge rates were defined as $C_{0.2}$ (discharge capacity at 0.2 C) and $C_{2.0}$ (discharge capacity at 2.0 C); the capacity change given by $\Delta C$=discharge capacity at $C_{2.0}/C_{0.2} \times 100(\%)$ was calculated and then evaluated on the following criteria.

Higher capacity changes $\Delta C$ correspond to better discharge rate characteristics (rate characteristics).
A: $\Delta C$: 83% or more
B: $\Delta C$: 82% or more and less than 83%
C: $\Delta C$: 80% or more and less than 82%
D: $\Delta C$: less than 80%

<Cycle Characteristics>

A fabricated laminated cell lithium ion secondary battery was filled with an electrolyte solution and then left to stand for 5 hours. Subsequently, the battery was charged to a cell voltage of 3.65 V by the constant-current method at 0.2 C in an atmosphere of 25° C. After that, the temperature was raised to 60° C. and aging was performed for 12 hours. The battery was then discharged to a cell voltage of 3.00 V by the constant-current method at 0.2 C in an atmosphere of 25° C.

Further, 100 charge-discharge cycles were performed at a charge voltage of 4.20 V, a charge/discharge rate of 1.0 C, and a discharge voltage of 3.00 V in an environment of 60° C. The capacity of the first cycle, that is, the initial discharge capacity X1 and the discharge capacity of the hundredth cycle X2 were measured; the capacity change given by $\Delta C'=(X2/X1) \times 100(\%)$ was determined and then evaluated on the following criteria. Higher capacity changes $\Delta C'$ correspond to better cycle characteristics.
A: $\Delta C'$: 85% or more
B: $\Delta C'$: 83% or more and less than 85%
C: $\Delta C'$: 80% or more and less than 83%
D: $\Delta C'$: less than 80%

<Expansion After Cycle>

A cell was disassembled after the above measurement of the cycle characteristics and the negative electrode was taken out, thereby measuring the thickness of the negative electrode (d2)(excluding the thickness of the current collector). Subsequently, the ratio of d2 to the thickness (d0) of the negative electrode before the fabrication of the lithium ion secondary battery (excluding the thickness of the current collector) ("post-cycle expansion characteristics"=(d2/d0)× 100(%)) was calculated and then evaluated on the following criteria. Lower post-cycle expansion characteristics correspond to smaller expansion of the negative electrode after cycles.
A: Post-cycle expansion characteristics: less than 115%
B: Post-cycle expansion characteristics: 115% or more and less than 118%
C: Post-cycle expansion characteristics: 118% or more and less than 120%
D: Post-cycle expansion characteristics: 120% or more <Adherence between Negative Electrode Mix Layer and Current Collector>

A fabricated negative electrode for a secondary battery was cut into strips having a length of 100 mm and a width of 10 mm to obtain test pieces. A piece of cellophane tape (provided in JIS Z 1522) was pasted to the surface of the negative electrode mix layer in each strip with the surface having the negative electrode mix layer facing down. Subsequently, one end of the current collector was pulled and peeled in the vertical direction at a pulling speed of 50 mm/min, and the stress applied was measured (note that the cellophane tape is fixed to a test board). The measurement was performed three times. The average of the stress measured was calculated as the peel strength and evaluated on the following criteria. Larger values of the peel strength correspond to better adherence between the negative electrode mix layer and the current collector.
A: Peel strength: 30 N/m or more
B: Peel strength: 25 N/m or more and less than 30 N/m
C: Peel strength: 20 N/m or more and less than 25 N/m
D: Peel strength: less than 20 N/m <Injection Property of Electrolyte Solution>

A fabricated negative electrode for a secondary battery was cut into a circular piece having a diameter of 16 mm, and 1 μL of propylene carbonate (reagent produced by KISHIDA CHEMICAL Co., Ltd.) was dropped on the surface of the circular piece having the negative electrode mix layer. The time after the drop until the drop of propylene carbonate on the negative electrode penetrates into the negative electrode mix layer (penetration time) was measured by visual observation and was then evaluated on the following criteria. The shorter the penetration time is, the better is the affinity between the negative electrode and propylene carbonate contained in a typical electrolyte solution, accordingly indicating better injection property of the electrolyte solution in the production of the secondary battery.
A: Penetration time: less than 180 s
B: Penetration time: 180 s or more and less than 240 s
C: Penetration time: 240 s or more and less than 300 s
D: Penetration time: 300 s or more <Water Resistance of Negative Electrode>

A fabricated negative electrode for a secondary battery was cut into a circular piece having a diameter of 16 mm, and the mass of the circular piece was measured. The mass of the negative electrode mix layer (W1) was calculated by subtracting the mass of the current collector from the measured mass. The circular negative electrode was put into a sample bottle and 50 mL of ion-exchanged water was poured into the bottle. A heat treatment was then performed at 60° C. for 72 hours. After that, the circular negative electrode was removed and washed with ion-exchanged water, and then dried at 120° C. for 1 hour. The mass of the dried negative electrode was measured, and the mass of the negative electrode mix layer (W2) was calculated by subtracting the mass of the current collector from the measured mass. The mass change caused by the immersion into the ion-exchanged water and the heat treatment was defined by [(W1−W2)/W1]×100, and was evaluated on the following criteria. Smaller mass change corresponds to better water resistance of the negative electrode.
A: Mass change: less than 5%
B: Mass change: 5% or more and less than 10%
C: Mass change: 10% or more and less than 20%
D: Mass change: 20% or more <Preparation of Particulate Polymer (C)>

(Production Example 1) Particulate polymer C1—Polymer having carboxy group and hydroxy group—

Sixty five parts of styrene as an aromatic vinyl monomer, 35 parts of 1,3-butadiene as an aliphatic conjugated diene monomer, 4 parts of itaconic acid as an ethylenic unsaturated carboxylic acid monomer, 1 part of 2-hydroxyethyl acrylate as a hydroxy group-containing monomer, 0.3 part of t-dodecylmercaptan as a molecular weight regulator, 5 parts of dodecyl benzene sulfonate as an emulsifier, 150 parts of ion-exchanged water as a solvent, and 1 part of potassium persulfate as a polymerization initiator were loaded into a 5 MPa pressure resistant vessel with a mixer and sufficiently mixed, and then heated to 55° C. to start polymerization.

When the monomer consumption reached 95.0%, cooling was performed to stop the reaction. A sodium hydroxide 5% aqueous solution was added to aqueous dispersion containing the thus obtained polymer and the mixed solution was adjusted to pH 8. After that, unreacted monomers were removed by heated vacuum distillation. Further cooling was then performed to 30° C. or less to obtain a water dispersion of a particulate polymer C1. The gel content and the glass-transition temperature of a water dispersion of the obtained particulate polymer C1 were measured by the above-described methods. From the result of the measurement, the gel content was 90%, and the glass-transition temperature (Tg) was 10° C.

(Production Example 2) Particulate polymer C2—Polymer having carboxy group—

A water dispersion of a particulate polymer C2 was obtained in the same manner as Production Example 1 above, except that the polymerization was performed without 2-hydroxyethyl acrylate being added as a hydroxy group-containing monomer unlike in Production Example 1. From the result, the gel content of the obtained particulate polymer C2 was 90%, and the glass-transition temperature (Tg) thereof was 10° C.

(Production Example 3) Particulate polymer C3—Polymer having carboxy group and thiol group—

A water dispersion of a particulate polymer C3 was obtained in the same manner as Production Example 1 above, except that 0.15 part of pentaerythritol tetrakis(3-mercaptobutylate) was used instead of 2-hydroxyethyl acrylate as a hydroxy group-containing monomer and t-dodecylmercaptan was not added as a molecular weight regulator unlike in Production Example 1. From the result, the gel content of the obtained particulate polymer C3 was 90%, and the glass-transition temperature (Tg) thereof was 10° C.

Example 1

Preparation of Slurry Composition for Secondary Battery

Ten thousand parts of natural graphite which is a carbon-based active material, 100 parts in solid content equivalent of a 1% aqueous solution of "MAC350HC" (carboxymethyl cellulose A1 produced by Nippon Paper Industries Co., Ltd., degree of etherification: 0.8, viscosity of 1% aqueous solution: 3500 mPa·s) as the water-soluble thickener (A); 0.1 part in solid content equivalent of "EX-313" (cross-linking agent B1 produced by Nagase ChemteX Corporation, the number of functional groups: 3 (a mixture of a compound having two epoxy groups and one hydroxy group per molecule and a compound having three epoxy groups per molecule)/1 molecule, water solubility: 90% or more, viscosity of 1% aqueous solution: 140 mPa·s) as the cross-linking agent (B); and 100 parts in solid content equivalent of a water dispersion of the particulate polymer C1 were charged into a planetary mixer. Ion-exchanged water was then added and mixed thereinto to a solid content concentration of 52%. Thus, a slurry composition for a secondary battery (negative electrode) containing a binder composition for a secondary battery, which include the carboxymethyl cellulose A1, the cross-linking agent B1, and the particulate polymer C1, was prepared.

<Production of Negative Electrode>

The above-described slurry composition for a secondary battery was applied by a comma coater onto copper foil (current collector) having a thickness of 20 μm such that the coating amount was 8.8 mg/cm$^2$ to 9.2 mg/cm$^2$. The copper foil coated with the slurry composition for a secondary battery was transferred in a 60° C. oven for 2 minutes and in a 120° C. oven for 2 minutes, at a speed of 0.3 m/min, thereby drying the slurry composition on the copper foil. Thus, a negative electrode web was obtained.

The obtained web was pressed by a roller press machine to achieve a density of 1.45 g/cm$^3$ to 1.55 g/cm$^3$. Further, in order to remove water and further promote crosslinking, the web was left in an environment of 120° C. in a vacuum for 10 hours. Thus, a negative electrode was obtained.

Using the fabricated negative electrode, the adherence between the negative electrode mix layer and the current collector, the injection property of the electrolyte solution, and the water resistance of the negative electrode were evaluated. The results are shown in Table 1.

<Production of Positive Electrode>

A planetary mixer was loaded with 100 parts of LiCoO$_2$ as a positive electrode active material, 2 parts of acetylene black ("HS-100" produced by DENKI KAGAKU KOGYO KABUSHIKI KAISHA) as a conductive agent, 2 parts of PVDF (polyvinylidene fluoride "KF-1100" produced by KUREHA CORPORATION), and N-methylpyrrolidone so that the total solid content concentration was 67%. Those materials were then mixed. Thus, a slurry composition for a positive electrode was prepared.

The obtained positive electrode slurry composition was applied by a comma coater onto aluminum foil having a thickness of 20 μm and was then dried. The drying was performed by transferring the aluminum foil at a speed of 0.5 m/min in an oven at 60° C. for 2 minutes. After that, a heat treatment was performed at 120° C. for 2 minutes. Thus, a positive electrode web was obtained.

After drying the obtained web, the web was pressed by a roller press machine to achieve a density of 3.40 g/cm$^3$ to 3.50 g/cm$^3$ after the pressing. Further, in order to remove water, the web was left in an environment of 120° C. in a vacuum for 3 hours. Thus, a positive electrode was obtained.

<Method of Producing Lithium Ion Secondary Battery>

A single layer separator made of polypropylene (width: 65 mm, length: 500 mm, thickness: 25 mm; and porosity: 55%, produced by a dry method) was prepared. The separator was cut into a 5×5 cm$^2$ square. Further, an aluminum outer package was prepared as the package of the battery.

The fabricated positive electrode was cut into a 4×4 cm$^2$ square sheet and placed such that the surface on the current collector side of the positive electrode is in contact with the aluminum outer package. Next, the above-described square separator was placed on the positive electrode mix layer of the positive electrode. The fabricated negative electrode was cut into a 4.2×4.2 cm$^2$ square sheet and placed on the separator such that the surface on the negative electrode mix layer side of the negative electrode faces the separator. After that, a LiPF$_6$ solution with a concentration of 1.0 M was charged as an electrolyte solution. The LiPF$_6$ solution was a mixture of ethylene carbonate (EC)/ethylmethyl carbonate (EMC)=½ (in volume) and contained vinylene carbonate as an additive in an amount of 2% by volume (with respect the solvent). In order to tightly seal up the opening of the aluminum outer package, the aluminum package was closed by heat sealing at 150° C. Thus, a lithium ion secondary battery was produced.

The initial coulombic efficiency, the rate characteristics, the cycle characteristics, and the post-cycle expansion of the fabricated lithium ion secondary battery were evaluated. The results are shown in Table 1.

Examples 2 to 9

Slurry compositions for a secondary battery containing the binder composition for a secondary battery, negative electrodes, and lithium ion secondary batteries were produced in the same manner as Example 1, except that the cross-linking agent B1 was added in amounts of 0.5 part, 1 part, 5 parts, 10 parts, 15 parts, 30 parts, 50 parts, and 90 parts in solid content equivalent. The evaluations were then performed in the same manner as Example 1. The results are shown in Table 1.

Examples 10 to 13

Slurry compositions for a secondary battery containing the binder composition for a secondary battery, negative electrodes, and lithium ion secondary batteries were produced in the same manner as Example 1, except that 100 parts in solid content equivalent of "MAC500LC" (carboxymethyl cellulose A2 produced by Nippon Paper Industries Co., Ltd., degree of etherification: 0.65, viscosity of 1% aqueous solution: 4200 mPa·s) was used instead of carboxymethyl cellulose A1, which was the water-soluble thickener (A), and the cross-linking agent B1 was added in amounts of 0.5 part, 5 parts, 15 parts, and 30 parts in solid content equivalent. The evaluations were then performed in the same manner as Example 1. The results are shown in Table 1.

Examples 14 to 17

Slurry compositions for a secondary battery containing the binder composition for a secondary battery, negative electrodes, and lithium ion secondary batteries were produced in the same manner as Example 6, except that 100 parts in solid content equivalent of "1380" (carboxymethyl cellulose A3 produced by Daicel FineChem Ltd., degree of etherification: 1.2, viscosity of 1% aqueous solution: 1100 mPa·s), 100 parts in solid content equivalent of "MAC200HC" (carboxymethyl cellulose A4 produced by Nippon Paper Industries Co., Ltd., degree of etherification: 0.9, viscosity of 1% aqueous solution: 1100 mPa·s), 100 parts in solid content equivalent of "MAC800LC" (carboxymethyl cellulose A5 produced by Nippon Paper Industries Co., Ltd., degree of etherification: 0.65, viscosity of the 1% aqueous solution: 8500 mPa·s), and 100 parts in solid content equivalent of "MAC1400LC" (carboxymethyl cellulose A6 produced by Nippon Paper Industries Co., Ltd., degree of etherification: 0.65, viscosity of 1% aqueous solution: 9100 mPa·s) was used instead of carboxymethyl cellulose A1, which was the water-soluble thickener (A). The evaluations were then performed in the same manner as Example 1. The results are shown in Table 1.

Examples 18 to 20

Slurry compositions for a secondary battery containing the binder composition for a secondary battery, negative electrodes, and lithium ion secondary batteries were produced in the same manner as Example 6, except that the water dispersion of the particulate polymer C1 was added in amounts of 50 parts, 300 parts, and 200 parts in solid content equivalent. The evaluations were then performed in the same manner as Example 1. The results are shown in Table 1.

Examples 21 and 22

Slurry compositions for a secondary battery containing the binder composition for a secondary battery, negative electrodes, and lithium ion secondary batteries were produced in the same manner as Example 6, except that a water dispersion of the particulate polymer C2 and a water dispersion of the particulate polymer C3 were used, each in amounts of 100 parts in solid content equivalent, instead of the water dispersion of the particulate polymer C1. The evaluations were then performed in the same manner as Example 1. The results are shown in Table 1.

Examples 23 to 26

Slurry compositions for a secondary battery containing the binder composition for a secondary battery, negative electrodes, and lithium ion secondary batteries were produced in the same manner as Example 1, except that 15 parts in solid content equivalent of "EX-521" (cross-linking agent B2 produced by Nagase ChemteX Corporation, the number of epoxy groups 3/1 molecule, water solubility: 90% or more, viscosity of 1% aqueous solution: 4600 mPa·s), 15 parts in solid content equivalent of "ethylene glycol diglycidyl ether" (cross-linking agent B3 produced by Tokyo Chemical Industry Co., Ltd., the number of epoxy groups 2/1 molecule, water solubility: 90% or more (in the emulsion form), viscosity of 1% aqueous solution: less than 100 mPa·s), 15 parts in solid content equivalent of "1,4-butanediol diglycidyl ether" (cross-linking agent B4 produced by Tokyo Chemical Industry Co., Ltd., the number of epoxy groups 2/1 molecule, water solubility: 90% or more, viscosity of 1% aqueous solution: less than 100 mPa·s), and 15 parts in solid content equivalent of "EX-421" (cross-linking agent B5 produced by Nagase ChemteX Corporation, the number of epoxy groups 3/1 molecule, water solubility: 80% or more and less than 90%, viscosity of 1% aqueous solution: 640 mPa·s) were used instead of "EX-313" which is the cross-linking agent B1. The evaluations were then performed in the same manner as Example 1. The results are shown in Table 1.

Examples 27 and 28

Slurry compositions for a secondary battery containing the binder composition for a secondary battery, negative electrodes, and lithium ion secondary batteries were produced in the same manner as Example 6, except that 100 parts in solid content equivalent of polyacrylic acid (produced by Sigma-Aldrich, viscosity of 1% aqueous solution: 750 mPa·s) and 100 parts in solid content equivalent of polyvinyl alcohol (produced by Tokyo Chemical Industry Co., Ltd., viscosity of 1% aqueous solution: 700 mPa·s) were used instead of carboxymethyl cellulose A1, which was the water-soluble thickener (A). The evaluations were then performed in the same manner as Example 1. The results are shown in Table 1.

Example 29

Slurry compositions for a secondary battery containing the binder composition for a secondary battery, negative electrodes, and lithium ion secondary batteries were produced in the same manner as Example 1, except that 15 parts in solid content equivalent of "allyl glycidyl ether" (cross-linking agent B6 produced by Tokyo Chemical Industry Co., Ltd., the number of epoxy groups 1/1 molecule, water solubility: 90% or more, viscosity of 1% aqueous solution: less than 100 mPa·s) was used instead of "EX-313" which is the cross-linking agent B1. The evaluations were then performed in the same manner as Example 1. The results are shown in Table 1.

Comparative Example 1

A Slurry composition for a secondary battery containing the binder composition for a secondary battery, a negative electrode, and a lithium ion secondary battery were produced in the same manner as Example 6, except that the cross-linking agent B1 was not used. The evaluations were then performed in the same manner as Example 1. The results are shown in Table 2.

Comparative Example 2

A Slurry composition for a secondary battery containing the binder composition for a secondary battery, a negative electrode, and a lithium ion secondary battery were produced in the same manner as Example 21, except that the cross-linking agent B1 was not used. The evaluations were then performed in the same manner as Example 1. The results are shown in Table 2.

Comparative Example 3

A Slurry composition for a secondary battery containing the binder composition for a secondary battery, and a negative electrode were produced in the same manner as Example 6, except that the water dispersion of the particulate polymer C1 was not used. Since the negative electrode mix layer of the obtained negative electrode was brittle, a lithium ion secondary battery failed to be produced.

Comparative Example 4

A Slurry composition for a secondary battery containing the binder composition for a secondary battery, a negative electrode, and a lithium ion secondary battery were produced in the same manner as Example 6, except that the cross-linking agent B1 was added in an amount of 100 parts in solid content equivalent. The evaluations were then performed in the same manner as Example 1. The results are shown in Table 2.

Comparative Example 5

A Slurry composition for a secondary battery containing the binder composition for a secondary battery, a negative electrode, and a lithium ion secondary battery were produced in the same manner as Example 6, except that the water dispersion of the particulate polymer C1 was added in an amount of 550 parts in solid content equivalent. The evaluations were then performed in the same manner as Example 1. The results are shown in Table 2.

Note that in Tables 1 and 2, "CMC" represents carboxymethyl cellulose, "PAA" represents polyacrylic acid, and "PVA" represents polyvinyl alcohol.

TABLE 1

| | | EXAMPLE | | | | | | | |
|---|---|---|---|---|---|---|---|---|---|
| | | 1 | 2 | 3 | 4 | 5 | 6 | 7 | 8 |
| Water-soluble thickener (A) | Kind | CMC (A1) | CMC (A1) | CMC (A1) | CMC (A1) | CMC (A1) | CMC (A1) | CMC (A1) | CMC (A1) |
| | Degree of etherification of CMC | 0.8 | 0.8 | 0.8 | 0.8 | 0.8 | 0.8 | 0.8 | 0.8 |
| | Viscosity of 1 mass % aqueous solution [mPa·s] | 3500 | 3500 | 3500 | 3500 | 3500 | 3500 | 3500 | 3500 |
| | Content [parts by mass] | 100 | 100 | 100 | 100 | 100 | 100 | 100 | 100 |
| Cross-linking agent (B) | Kind | B1 | B1 | B1 | B1 | B1 | B1 | B1 | B1 |
| | Functional groups per molecule [Number] | 3 | 3 | 3 | 3 | 3 | 3 | 3 | 3 |
| | Viscosity of 1 mass % aqueous solution [mPa·s] | 140 | 140 | 140 | 140 | 140 | 140 | 140 | 140 |
| | Water solubility [%] | ≥90 | ≥90 | ≥90 | ≥90 | ≥90 | ≥90 | ≥90 | ≥90 |
| | Content [parts by mass] | 0.1 | 0.5 | 1 | 5 | 10 | 15 | 30 | 50 |
| Particulate polymer (C) | Kind | C1 | C1 | C1 | C1 | C1 | C1 | C1 | C1 |
| | Functional groups | Carboxy group + Hydroxy group | Carboxy group + Hydroxy group | Carboxy group + Hydroxy group | Carboxy group + Hydroxy group | Carboxy group + Hydroxy group | Carboxy group + Hydroxy group | Carboxy group + Hydroxy group | Carboxy group + Hydroxy group |
| | Gel content | 90 | 90 | 90 | 90 | 90 | 90 | 90 | 90 |
| | Glass-transition temperature [° C.] | 10 | 10 | 10 | 10 | 10 | 10 | 10 | 10 |
| | Content [parts by mass] | 100 | 100 | 100 | 100 | 100 | 100 | 100 | 100 |
| Negative electrode active material | Kind | Natural graphite | Natural graphite | Natural graphite | Natural graphite | Natural graphite | Natural graphite | Natural graphite | Natural graphite |
| | Content [parts by mass] | 10000 | 10000 | 10000 | 10000 | 10000 | 10000 | 10000 | 10000 |
| | Initial coulombic efficiency | A | A | A | A | A | A | A | A |
| | Rate characteristics | C | B | B | A | A | A | A | A |
| | Cycle characteristics | C | B | B | A | A | A | A | B |
| | Expansion suppression (after cycle) | B | B | B | A | A | A | A | A |
| | Adherence between Negative electrode active material layer and Current collector | C | B | A | A | A | A | A | B |
| | Injection property of Electrolyte solution | B | B | B | A | A | A | A | A |
| | Water resistance of Negative electrode | B | A | A | A | A | A | A | A |

TABLE 1-continued

| | | Example | | | | | | |
|---|---|---|---|---|---|---|---|---|
| | | 9 | 10 | 11 | 12 | 13 | 14 | 15 |
| Water-soluble thickener (A) | Kind | CMC (A1) | CMC (A2) | CMC (A2) | CMC (A2) | CMC (A2) | CMC (A3) | CMC (A4) |
| | Degree of etherification of CMC | 0.8 | 0.65 | 0.65 | 0.65 | 0.65 | 1.2 | 0.9 |
| | Viscosity of 1 mass % aqueous solution [mPa · s] | 3500 | 4200 | 4200 | 4200 | 4200 | 1100 | 1100 |
| | Content [parts by mass] | 100 | 100 | 100 | 100 | 100 | 100 | 100 |
| Cross-linking agent (B) | Kind | B1 | B1 | B1 | B1 | B1 | B1 | B1 |
| | Functional groups per molecule [Number] | 3 | 3 | 3 | 3 | 3 | 3 | 3 |
| | Viscosity of 1 mass % aqueous solution [mPa · s] | 140 | 140 | 140 | 140 | 140 | 140 | 140 |
| | Water solubility [%] | ≥90 | ≥90 | ≥90 | ≥90 | ≥90 | ≥90 | ≥90 |
| | Content [parts by mass] | 90 | 0.5 | 5 | 15 | 30 | 15 | 15 |
| Particulate polymer (C) | Kind | C1 | C1 | C1 | C1 | C1 | C1 | C1 |
| | Functional groups | Carboxy group + Hydroxy group | Carboxy group + Hydroxy group | Carboxy group + Hydroxy group | Carboxy group + Hydroxy group | Carboxy group + Hydroxy group | Carboxy group + Hydroxy group | Carboxy group + Hydroxy group |
| | Gel content | 90 | 90 | 90 | 90 | 90 | 90 | 90 |
| | Glass-transition temperature [° C.] | 10 | 10 | 10 | 10 | 10 | 10 | 10 |
| | Content [parts by mass] | 100 | 100 | 100 | 100 | 100 | 100 | 100 |
| Negative electrode active material | Kind | Natural graphite | Natural graphite | Natural graphite | Natural graphite | Natural graphite | Natural graphite | Natural graphite |
| | Content [parts by mass] | 10000 | 10000 | 10000 | 10000 | 10000 | 10000 | 10000 |
| Initial coulombic efficiency | | A | B | B | B | B | A | A |
| Rate characteristics | | B | B | B | B | B | B | A |
| Cycle characteristics | | B | B | B | B | B | B | A |
| Expansion suppression (after cycle) | | B | B | B | B | B | B | A |
| Adherence between Negative electrode active material layer and Current collector | | B | B | B | B | B | C | A |
| Injection property of Electrolyte solution | | A | B | B | B | B | A | A |
| Water resistance of Negative electrode | | A | A | A | A | A | A | A |

| | | Example | | | | | | |
|---|---|---|---|---|---|---|---|---|
| | | 16 | 17 | 18 | 19 | 20 | 21 | 22 |
| Water-soluble thickener (A) | Kind | CMC (A5) | CMC (A6) | CMC (A1) | CMC (A1) | CMC (A1) | CMC (A1) | CMC (A1) |
| | Degree of etherification of CMC | 0.65 | 0.65 | 0.8 | 0.8 | 0.8 | 0.8 | 0.8 |
| | Viscosity of 1 mass % aqueous solution [mPa · s] | 8500 | 9100 | 3500 | 3500 | 3500 | 3500 | 3500 |
| | Content [parts by mass] | 100 | 100 | 100 | 100 | 100 | 100 | 100 |
| Cross-linking agent (B) | Kind | B1 | B1 | B1 | B1 | B1 | B1 | B1 |
| | Functional groups per molecule [Number] | 3 | 3 | 3 | 3 | 3 | 3 | 3 |
| | Viscosity of 1 mass % aqueous solution [mPa · s] | 140 | 140 | 140 | 140 | 140 | 140 | 140 |
| | Water solubility [%] | ≥90 | ≥90 | ≥90 | ≥90 | ≥90 | ≥90 | ≥90 |
| | Content [parts by mass] | 15 | 15 | 15 | 15 | 15 | 15 | 15 |
| Particulate polymer (C) | Kind | C1 | C1 | C1 | C1 | C1 | C2 | C3 |
| | Functional groups | Carboxy group + Hydroxy group | Carboxy group + Hydroxy group | Carboxy group + Hydroxy group | Carboxy group + Hydroxy group | Carboxy group + Hydroxy group | Carboxy group | Carboxy group + Thiol group |
| | Gel content | 90 | 90 | 90 | 90 | 90 | 90 | 90 |
| | Glass-transition temperature [° C.] | 10 | 10 | 10 | 10 | 10 | 10 | 10 |
| | Content [parts by mass] | 100 | 100 | 50 | 300 | 200 | 100 | 100 |
| Negative electrode active material | Kind | Natural graphite | Natural graphite | Natural graphite | Natural graphite | Natural graphite | Natural graphite | Natural graphite |
| | Content [parts by mass] | 10000 | 10000 | 10000 | 10000 | 10000 | 10000 | 10000 |
| Initial coulombic efficiency | | B | B | A | A | A | A | A |
| Rate characteristics | | A | B | B | C | A | A | B |
| Cycle characteristics | | B | B | C | B | A | B | B |
| Expansion suppression (after cycle) | | A | A | B | B | A | B | B |
| Adherence between Negative electrode active material layer and Current collector | | A | C | C | A | A | B | A |
| Injection property of Electrolyte solution | | B | B | B | C | A | A | A |
| Water resistance of Negative electrode | | A | A | B | A | A | A | A |

TABLE 1-continued

| | | Example | | | | | | |
|---|---|---|---|---|---|---|---|---|
| | | 23 | 24 | 25 | 26 | 27 | 28 | 29 |
| Water-soluble thickener (A) | Kind | CMC (A1) | CMC (A1) | CMC (A1) | CMC (A1) | PAA | PVA | CMC (A1) |
| | Degree of etherification of CMC | 0.8 | 0.8 | 0.8 | 0.8 | — | — | 0.8 |
| | Viscosity of 1 mass % aqueous solution [mPa · s] | 3500 | 3500 | 3500 | 3500 | 750 | 700 | 3500 |
| | Content [parts by mass] | 100 | 100 | 100 | 100 | 100 | 100 | 100 |
| Cross-linking agent (B) | Kind | B2 | B3 | B4 | B5 | B1 | B1 | B6 |
| | Functional groups per molecule [Number] | 3 | 2 | 2 | 3 | 3 | 3 | 1 |
| | Viscosity of 1 mass % aqueous solution [mPa · s] | 4600 | <100 | <100 | 640 | 140 | 140 | <100 |
| | Water solubility [%] | ≥90 | ≥90 (Emulsion) | ≥90 | ≥80 <90 | ≥90 | ≥90 | ≥90 |
| | Content [parts by mass] | 15 | 15 | 15 | 15 | 15 | 15 | 15 |
| Particulate polymer (C) | Kind | C1 | C1 | C1 | C1 | C1 | C1 | C1 |
| | Functional groups | Carboxy group + Hydroxy group | Carboxy group + Hydroxy group | Carboxy group + Hydroxy group | Carboxy group + Hydroxy group | Carboxy group + Hydroxy group | Carboxy group + Hydroxy group | Carboxy group + Hydroxy group |
| | Gel content | 90 | 90 | 90 | 90 | 90 | 90 | 90 |
| | Glass-transition temperature [° C.] | 10 | 10 | 10 | 10 | 10 | 10 | 10 |
| | Content [parts by mass] | 100 | 100 | 100 | 100 | 100 | 100 | 100 |
| Negative electrode active material | Kind | Natural graphite | Natural graphite | Natural graphite | Natural graphite | Natural graphite | Natural graphite | Natural graphite |
| | Content [parts by mass] | 10000 | 10000 | 10000 | 10000 | 10000 | 10000 | 10000 |
| | Initial coulombic efficiency | A | A | A | B | C | C | C |
| | Rate characteristics | A | A | A | A | C | C | C |
| | Cycle characteristics | A | A | A | B | C | C | C |
| | Expansion suppression (after cycle) | A | A | A | B | C | C | C |
| | Adherence between Negative electrode active material layer and Current collector | B | B | A | B | C | C | C |
| | Injection property of Electrolyte solution | B | B | A | B | B | B | C |
| | Water resistance of Negative electrode | A | A | A | A | B | B | C |

TABLE 2

| | | COMPARATIVE EXAMPLE | | | | |
|---|---|---|---|---|---|---|
| | | 1 | 2 | 3 | 4 | 5 |
| Water-soluble thickener (A) | Kind | CMC (A1) | CMC (A1) | CMC (A1) | CMC (A1) | CMC (A1) |
| | Degree of etherification of CMC | 0.8 | 0.8 | 0.8 | 0.8 | 0.8 |
| | Viscosity of 1 mass % aqueous solution [mPa · s] | 3500 | 3500 | 3500 | 3500 | 3500 |
| | Content [parts by mass] | 100 | 100 | 100 | 100 | 100 |
| Cross-linking agent (B) | Kind | — | — | B1 | B1 | B1 |
| | Functional groups per molecule [Number] | — | — | 3 | 3 | 3 |
| | Viscosity of 1 mass % aqueous solution [mPa · s] | — | — | 140 | 140 | 140 |
| | Water solubility [%] | — | — | ≥90 | ≥90 | ≥90 |
| | Content [parts by mass] | 0 | 0 | 15 | 100 | 15 |
| Particulate polymer (C) | Kind | C1 | C2 | — | C1 | C1 |
| | Functional groups | Carboxy group + Hydroxy group | Carboxy group | — | Carboxy group + Hydroxy group | Carboxy group + Hydroxy group |
| | Gel content | 90 | 90 | — | 90 | 90 |
| | Glass-transition temperature [° C.] | 10 | 10 | — | 10 | 10 |
| | Content [parts by mass] | 100 | 100 | 0 | 100 | 550 |
| Negative electrode active material | Kind | Natural graphite | Natural graphite | Natural graphite | Natural graphite | Natural graphite |
| | Content [parts by mass] | 10000 | 10000 | 10000 | 10000 | 10000 |
| | Initial coulombic efficiency | D | D | — | D | D |
| | Rate characteristics | D | D | — | D | D |
| | Cycle characteristics | D | D | — | D | D |
| | Expansion suppression (after cycle) | D | D | — | D | D |

TABLE 2-continued

| | COMPARATIVE EXAMPLE | | | | |
|---|---|---|---|---|---|
| | 1 | 2 | 3 | 4 | 5 |
| Adherence between Negative electrode active material layer and Current collector | D | D | — | D | A |
| Injection property of Electrolyte solution | D | D | — | D | D |
| Water resistance of Negative electrode | D | D | — | D | D |

Table 1 shows that in Examples 1 to 29 where the predetermined water-soluble thickener (A), cross-linking agent (B), and the particulate polymer (C) were used in certain proportion, the expansion of the negative electrode upon charge and discharge was successfully suppressed, satisfactory adherence between the negative electrode and the current collector and satisfactory injection property of the electrolyte solution were successfully ensured, and the electrical characteristics of the lithium ion secondary battery was successfully improved. Table 1 also shows that the water resistance of the negative electrode was also improved.

On the other hand, Table 2 shows that in Comparative Examples 1 and 2, in which the cross-linking agent (B) was not used, and in Comparative Example 4, in which the excessive amount of the cross-linking agent (B) was used, the expansion of the negative electrode upon charge and discharge was not suppressed, satisfactory adherence between the negative electrode and the current collector and satisfactory injection property of the electrolyte solution were not ensured, and the electrical characteristics of the lithium ion secondary battery were not improved. Further, the negative electrodes in Comparative Example 1, 2, and 4 had low water resistance.

Table 2 also shows that in Comparative Example 5, in which the excessive amount of the particulate polymer (C) was mixed, although satisfactory adherence between the negative electrode and the current collector was successfully ensured, the negative electrode upon charge and discharge was not suppressed, satisfactory injection property of the electrolyte solution was not ensured, and the electrical characteristics of the lithium ion secondary battery were not improved. Further, the negative electrode in Comparative Example 5 had low water resistance.

In particular, Examples 1 to 9 and 18 to 20 in Table 1 shows that the suppression of the expansion of the negative electrode, the adherence between the negative electrode mix layer and the current collector, the injection property of the electrolyte solution, the electrical characteristics of the lithium ion secondary battery, and the water resistance of the negative electrode can all be achieved at a high level by adjusting the ratio of the cross-linking agent (B) and the particulate polymer (C) to the water-soluble thickener (A).

Further, Examples 6, 12, 14 to 17 in Table 1 show that that the suppression of the expansion of the negative electrode, the adherence between the negative electrode mix layer and the current collector, the injection property of the electrolyte solution, and the electrical characteristics of the lithium ion secondary battery can all be achieved at a high level by changing the degree of etherification and the viscosity of the 1 mass % aqueous solution of carboxymethyl cellulose, which is the water-soluble thickener (A).

Examples 6, 21, and 22 in Table 1 show that that the suppression of the expansion of the negative electrode, the adherence between the negative electrode mix layer and the current collector, the injection property of the electrolyte solution, and the electrical characteristics of the lithium ion secondary battery can all be achieved at a high level by appropriately selecting the kind of the functional group of the particulate polymer (C).

Examples 6 and 23 to 26 in Table 1 show that that the suppression of the expansion of the negative electrode, the adherence between the negative electrode mix layer and the current collector, the injection property of the electrolyte solution, and the electrical characteristics of the lithium ion secondary battery can all be achieved at a high level by changing the viscosity of the 1 mass % aqueous solution and the water solubility of the cross-linking agent (B).

In addition, Examples 6, 27, and 28 in Table 1 show that that the suppression of the expansion of the negative electrode, the adherence between the negative electrode mix layer and the current collector, the injection property of the electrolyte solution, and the electrical characteristics of the lithium ion secondary battery can all be achieved at a high level by appropriately changing the kind of the water-soluble thickener (A).

INDUSTRIAL APPLICABILITY

The binder composition for a secondary battery of this disclosure makes it possible to achieve good binding capacity and can improve the electrical characteristics of a secondary battery using a battery member formed using the binder composition. The slurry composition for a secondary battery of this disclosure can form an electrode which has excellent adherence between a current collector and an electrode active material layer, and can improve the electrical characteristics of the secondary battery.

The negative electrode for a secondary battery of this disclosure can improve the adherence between a current collector and a negative electrode mix layer and can improve the electrical characteristics of a secondary battery.

Moreover, the secondary battery of this disclosure can have improved electrical characteristics and can ensure satisfactory adherence between the negative electrode mix layer and the current collector.

The invention claimed is:

1. A binder composition for a secondary battery, comprising: a water-soluble thickener (A) having a hydroxy group or a carboxy group; a cross-linking agent (B) having a functional group reacting with the hydroxy group or the carboxy group of the water-soluble thickener (A); and a particulate polymer (C), wherein the particulate polymer (C) has a functional group reacting with the cross-linking agent (B) and includes an aliphatic conjugated diene monomer unit and an aromatic vinyl monomer unit, and the binder composition contains 0.001 part by mass or more and less than 100 parts by mass of the cross-linking agent (B) and 10 parts by mass or more and less than 500 parts by mass of the particulate polymer (C), each per 100 parts by mass of the water-soluble thickener (A).

2. The binder composition for a secondary battery, according to claim 1, wherein a water solubility of the cross-linking agent (B) is 80% by mass or more.

3. The binder composition for a secondary battery, according to claim 1, wherein the cross-linking agent (B) is a multifunctional epoxy compound.

4. The binder composition for a secondary battery, according to claim 1, wherein the water-soluble thickener (A) is at least one selected from the group consisting of carboxymethyl cellulose, methyl cellulose, hydroxypropyl methylcellulose, hydroxyethyl methylcellulose, polyvinyl alcohol, and polyacrylic acid, and salts thereof.

5. The binder composition for a secondary battery, according to claim 1, wherein the functional group in the particulate polymer (C) that reacts with the cross-linking agent (B) is at least one selected from the group consisting of a carboxy group, a hydroxy group, a glycidyl ether group, and a thiol group.

6. A slurry composition for a secondary battery, comprising: a water-soluble thickener (A) having a hydroxy group or a carboxy group; a cross-linking agent (B) having a functional group reacting with the hydroxy group or the carboxy group of the water-soluble thickener (A); a particulate polymer (C); an electrode active material; and water, wherein the particulate polymer (C) has a functional group reacting with the cross-linking agent (B) and includes an aliphatic conjugated diene monomer unit and an aromatic vinyl monomer unit, and the binder composition contains 0.001 part by mass or more and less than 100 parts by mass of the cross-linking agent (B) and 10 parts by mass or more and less than 500 parts by mass of the particulate polymer (C), each per 100 parts by mass of the water-soluble thickener (A).

7. A negative electrode for a secondary battery, comprising a negative electrode mix layer obtained from the slurry composition for a secondary battery, according to claim 6, wherein the electrode active material is a negative electrode active material.

8. A negative electrode for a secondary battery, according to claim 7, wherein the negative electrode mix layer has a crosslinking structure formed from the water-soluble thickener (A), the cross-linking agent (B), and the particulate polymer (C).

9. A secondary battery comprising: the negative electrode according to claim 7; a positive electrode; an electrolyte solution; and a separator.

10. The binder composition for a secondary battery, according to claim 1, wherein an aliphatic conjugated diene monomer that constitutes the aliphatic conjugated diene monomer units of the particulate polymer (C) is at least one selected from the group consisting of 1,3-butadiene, 2-methyl-1,3-butadiene, 2,3-dimethyl-1,3-butadiene, 2-chloro-1,3-butadiene, substituted straight-chain conjugated pentadienes, and substituted and side chain conjugated hexadienes.

11. The binder composition for a secondary battery, according to claim 1, wherein content percentage of the aliphatic conjugated diene monomer units contained in the particulate polymer (C) is 20% by mass or more and 70% by mass or less.

12. The slurry composition for a secondary battery, according to claim 6, wherein an aliphatic conjugated diene monomer that constitutes the aliphatic conjugated diene monomer units of the particulate polymer (C) is at least one selected from the group consisting of 1,3-butadiene, 2-methyl-1,3-butadiene, 2,3-dimethyl-1,3-butadiene, 2-chloro-1,3-butadiene, substituted straight-chain conjugated pentadienes, and substituted and side chain conjugated hexadienes.

13. The slurry composition for a secondary battery, according to claim 6, wherein content percentage of the aliphatic conjugated diene monomer units contained in the particulate polymer (C) is 20% by mass or more and 70% by mass or less.

14. The binder composition for a secondary battery, according to claim 1, wherein the gel content of the particulate polymer (C) is 50% by mass or more.

15. The slurry composition for a secondary battery, according to claim 6, wherein the gel content of the particulate polymer (C) is 50% by mass or more.

* * * * *